United States Patent
Kida et al.

(10) Patent No.: US 11,347,875 B2
(45) Date of Patent: *May 31, 2022

(54) CRYPTOGRAPHIC SEPARATION OF MEMORY ON DEVICE WITH USE IN DMA PROTECTION

(71) Applicant: Intel Corporation, Santa Clara, CA (US)

(72) Inventors: Luis S. Kida, Beaverton, OR (US); Reshma Lal, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 16/774,338

(22) Filed: Jan. 28, 2020

(65) Prior Publication Data
US 2020/0167487 A1    May 28, 2020

(51) Int. Cl.
*H04L 29/00*      (2006.01)
*G06F 21/60*      (2013.01)
(Continued)

(52) U.S. Cl.
CPC .......... *G06F 21/606* (2013.01); *G06F 21/44* (2013.01); *G06F 21/602* (2013.01); *G06F 21/72* (2013.01);
(Continued)

(58) Field of Classification Search
CPC ...... G06F 21/606; G06F 21/44; G06F 21/602; G06F 21/72; G06F 21/76; G06F 2221/2149; H04L 9/14
See application file for complete search history.

(56) References Cited

U.S. PATENT DOCUMENTS 7,716,389 B1    5/2010  Bruce
9,769,123 B2    9/2017  Grewal
(Continued)

FOREIGN PATENT DOCUMENTS

CA    2303297 C    11/2008

*Primary Examiner* — Ghazal B Shehni
(74) *Attorney, Agent, or Firm* — Jaffery Watson Mendonsa & Hamilton LLP

(57) ABSTRACT

A method comprises initializing, by an accelerator device of the computing device, an authentication tag in response to an initialization command from a trusted execution environment of the computing device, initiating a transfer, by the accelerator device, of data between a host memory and an accelerator device memory in response to a descriptor from the trusted execution environment, wherein the descriptor comprises a target memory address and is indicative of a transfer direction, comparing, in a memory range selection engine comprising at least one comparator to compare the target memory address with a plurality of address ranges and select a cryptographic key from the plurality of plurality of address range registers based on the target memory address, performing, by the accelerator device, a cryptographic operation with the data in response to transferring the data, updating, by the accelerator device, the authentication tag in response to transferring the data, and finalizing, by the accelerator device, the authentication tag in response to a finalization command from the trusted execution environment. Other embodiments are described and claimed.

20 Claims, 12 Drawing Sheets

(51) Int. Cl.
*G06F 21/72* (2013.01)
*G06F 21/76* (2013.01)
*G06F 21/44* (2013.01)
*H04L 9/14* (2006.01)

(52) U.S. Cl.
CPC ............... *G06F 21/76* (2013.01); *H04L 9/14* (2013.01); *G06F 2221/2149* (2013.01)

(56) References Cited

U.S. PATENT DOCUMENTS

| | | |
|---|---|---|
| 10,303,645 B2 | 5/2019 | Franke |
| 10,664,179 B2 | 5/2020 | Alexandrovichl |
| 2013/0326233 A1* | 12/2013 | Tollmans ............... G06F 21/602 713/189 |
| 2014/0237265 A1* | 8/2014 | Mothilal ............... H04L 9/0618 713/193 |
| 2017/0024568 A1 | 1/2017 | Pappachan |
| 2019/0132136 A1 | 5/2019 | Scarlata |
| 2020/0159657 A1 | 5/2020 | Kida |

\* cited by examiner

CRYPTOGRAPHIC SEPARATION OF MEMORY ON DEVICE WITH USE IN DMA PROTECTION

CROSS-REFERENCE TO RELATED APPLICATION

This application is related to and commonly assigned U.S. patent application Ser. No. 16/232,146, entitled TECHNOLOGIES FOR SECURE I/O WITH ACCELERATOR DEVICES, filed Dec. 26, 2018, the disclosure of which incorporates by reference the entire contents of and claims the benefit of and priority to U.S. Provisional Patent Application No. 62/687,403, filed Jun. 20, 2018.

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. Intel® SGX does not protect I/O data that moves across the on-chip boundary.

Modern computing devices may include general-purpose processor cores as well as a variety of hardware accelerators for offloading compute-intensive workloads or performing specialized tasks. Hardware accelerators may include, for example, one or more field-programmable gate arrays (FPGAs), which may include programmable digital logic resources that may be configured by the end user or system integrator. Hardware accelerators may also include one or more application-specific integrated circuits (ASICs). Hardware accelerators may be embodied as I/O devices that communicate with the processor core over an I/O interconnect

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
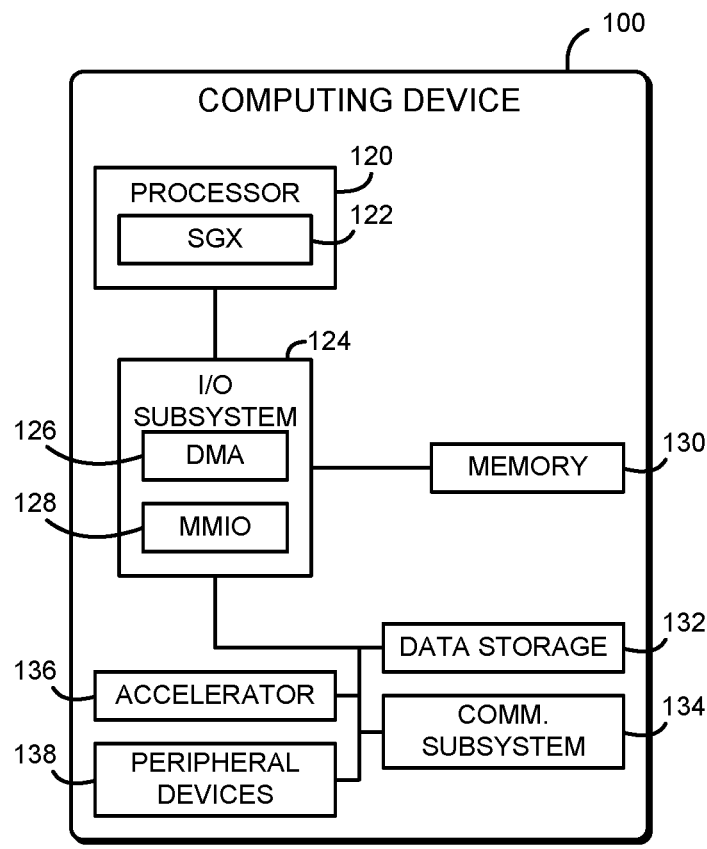
FIG. 1 is a simplified block diagram of at least one embodiment of a computing device for secure I/O with an accelerator device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing device 100 for secure I/O with an accelerator device includes a processor 120 and an accelerator device 136, such as a field-programmable gate array (FPGA). In use, as described further below, a trusted execution environment (TEE) established by the processor 120 securely communicates data with the accelerator 136. Data may be transferred using memory-mapped I/O (MMIO) transactions or direct memory access (DMA) transactions. For example, the TEE may perform an MMIO write transaction that includes encrypted data, and the accelerator 136 decrypts the data and performs the write. As another example, the TEE may perform an MMIO read request transaction, and the accelerator 136 may read the requested data, encrypt the data, and perform an MMIO read response transaction that includes the encrypted data. As yet another example, the TEE may configure the accelerator 136 to perform a DMA operation, and the accelerator 136 performs a memory transfer, performs a cryptographic operation (i.e., encryption or decryption), and forwards the result. As described further below, the TEE and the accelerator 136 generate authentication tags (ATs) for the transferred data and may use those ATs to validate the transactions. The computing device 100 may thus keep untrusted software of the computing device 100, such as the operating system or virtual machine monitor, outside of the trusted code base (TCB) of the TEE and the accelerator 136. Thus, the computing device 100 may secure data exchanged or otherwise processed by a TEE and an accelerator 136 from an owner of the computing device 100 (e.g., a cloud service provider) or other tenants of the computing device 100. Accordingly, the computing device 100 may improve security and performance for multi-tenant environments by allowing secure use of accelerator devices.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 124, a memory 130, and a data storage device 132. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, which allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 130. The secure enclave support 122 may be embodied as a set of processor instruction extensions that allows the processor 120 to establish one or more secure enclaves in the memory 130. For example, the secure enclave support 122 may be embodied as Intel® Software Guard Extensions (SGX) technology.

The memory 130 may be embodied as any type of volatile or non-volatile memory or data storage capable of performing the functions described herein. In operation, the memory 130 may store various data and software used during operation of the computing device 100 such as operating systems, applications, programs, libraries, and drivers. As shown, the memory 130 may be communicatively coupled to the processor 120 via the I/O subsystem 124, which may be embodied as circuitry and/or components to facilitate input/output operations with the processor 120, the memory 130, and other components of the computing device 100. For example, the I/O subsystem 124 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 130 may be directly coupled to the processor 120, for example via an integrated memory controller hub. Additionally, in some embodiments, the I/O subsystem 124 may form a portion of a system-on-a-chip (SoC) and be incorporated, along with the processor 120, the memory 130, the accelerator device 136, and/or other components of the computing device 100, on a single integrated circuit chip. Additionally, or alternatively, in some embodiments the processor 120 may include an integrated memory controller and a system agent, which may be embodied as a logic block in which data traffic from processor cores and I/O devices converges before being sent to the memory 130.

As shown, the I/O subsystem 124 includes a direct memory access (DMA) engine 126 and a memory-mapped I/O (MMIO) engine 128. The processor 120, including secure enclaves established with the secure enclave support 122, may communicate with the accelerator device 136 with one or more DMA transactions using the DMA engine 126 and/or with one or more MMIO transactions using the MMIO engine 128. The computing device 100 may include multiple DMA engines 126 and/or MMIO engines 128 for handling DMA and MMIO read/write transactions based on bandwidth between the processor 120 and the accelerator 136. Although illustrated as being included in the I/O subsystem 124, it should be understood that in some embodiments the DMA engine 126 and/or the MMIO engine 128 may be included in other components of the computing device 100 (e.g., the processor 120, memory controller, or system agent), or in some embodiments may be embodied as separate components.

The data storage device 132 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 134, which may be embodied as any communication circuit, device, or collection thereof, capable of enabling communications between the computing device 100 and other remote devices over a computer network (not shown). The communications subsystem 134 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The accelerator device 136 may be embodied as a field-programmable gate array (FPGA), an application-specific integrated circuit (ASIC), a coprocessor, or other digital logic device capable of performing accelerated functions (e.g., accelerated application functions, accelerated network functions, or other accelerated functions). Illustratively, the accelerator device 136 is an FPGA, which may be embodied as an integrated circuit including programmable digital logic resources that may be configured after manufacture. The FPGA may include, for example, a configurable array of logic blocks in communication over a configurable data interchange. The accelerator device 136 may be coupled to the processor 120 via a high-speed connection interface such as a peripheral bus (e.g., a PCI Express bus) or an inter-processor interconnect (e.g., an in-die interconnect (IDI) or QuickPath Interconnect (QPI)), or via any other appropriate interconnect. The accelerator device 136 may receive data and/or commands for processing from the processor 120 and return results data to the processor 120 via DMA, MMIO, or other data transfer transactions.

As shown, the computing device 100 may further include one or more peripheral devices 138. The peripheral devices 138 may include any number of additional input/output devices, interface devices, hardware accelerators, and/or other peripheral devices. For example, in some embodiments, the peripheral devices 138 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Figure 2:
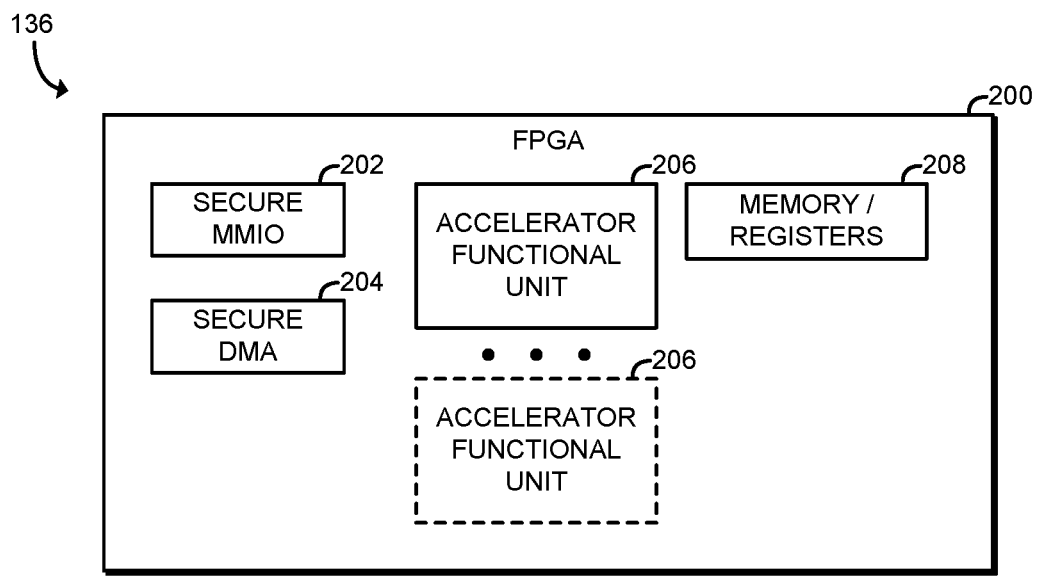
FIG. 2 is a simplified block diagram of at least one embodiment of an accelerator device of the computing device of FIG. 1.

Referring now to FIG. 2, an illustrative embodiment of a field-programmable gate array (FPGA) 200 is shown. As shown, the FPGA 200 is one potential embodiment of an accelerator device 136. The illustratively FPGA 200 includes a secure MMIO engine 202, a secure DMA engine 204, one or more accelerator functional units (AFUs) 206, and memory/registers 208. As described further below, the secure MMIO engine 202 and the secure DMA engine 204 perform in-line authenticated cryptographic operations on data transferred between the processor 120 (e.g., a secure enclave established by the processor) and the FPGA 200 (e.g., one or more AFUs 206). In some embodiments, the secure MMIO engine 202 and/or the secure DMA engine 204 may intercept, filter, or otherwise process data traffic on one or more cache-coherent interconnects, internal buses, or other interconnects of the FPGA 200.

Each AFU 206 may be embodied as logic resources of the FPGA 200 that are configured to perform an acceleration task. Each AFU 206 may be associated with an application executed by the computing device 100 in a secure enclave or other trusted execution environment. Each AFU 206 may be configured or otherwise supplied by a tenant or other user of the computing device 100. For example, each AFU 206 may correspond to a bitstream image programmed to the FPGA 200. As described further below, data processed by each AFU 206, including data exchanged with the trusted execution environment, may be cryptographically protected from untrusted components of the computing device 100 (e.g., protected from software outside of the trusted code base of the tenant enclave). Each AFU 206 may access or otherwise process stored in the memory/registers 208, which may be embodied as internal registers, cache, SRAM, storage, or other memory of the FPGA 200. In some embodiments, the memory 208 may also include external DRAM or other dedicated memory coupled to the FPGA 200.

Figure 3:
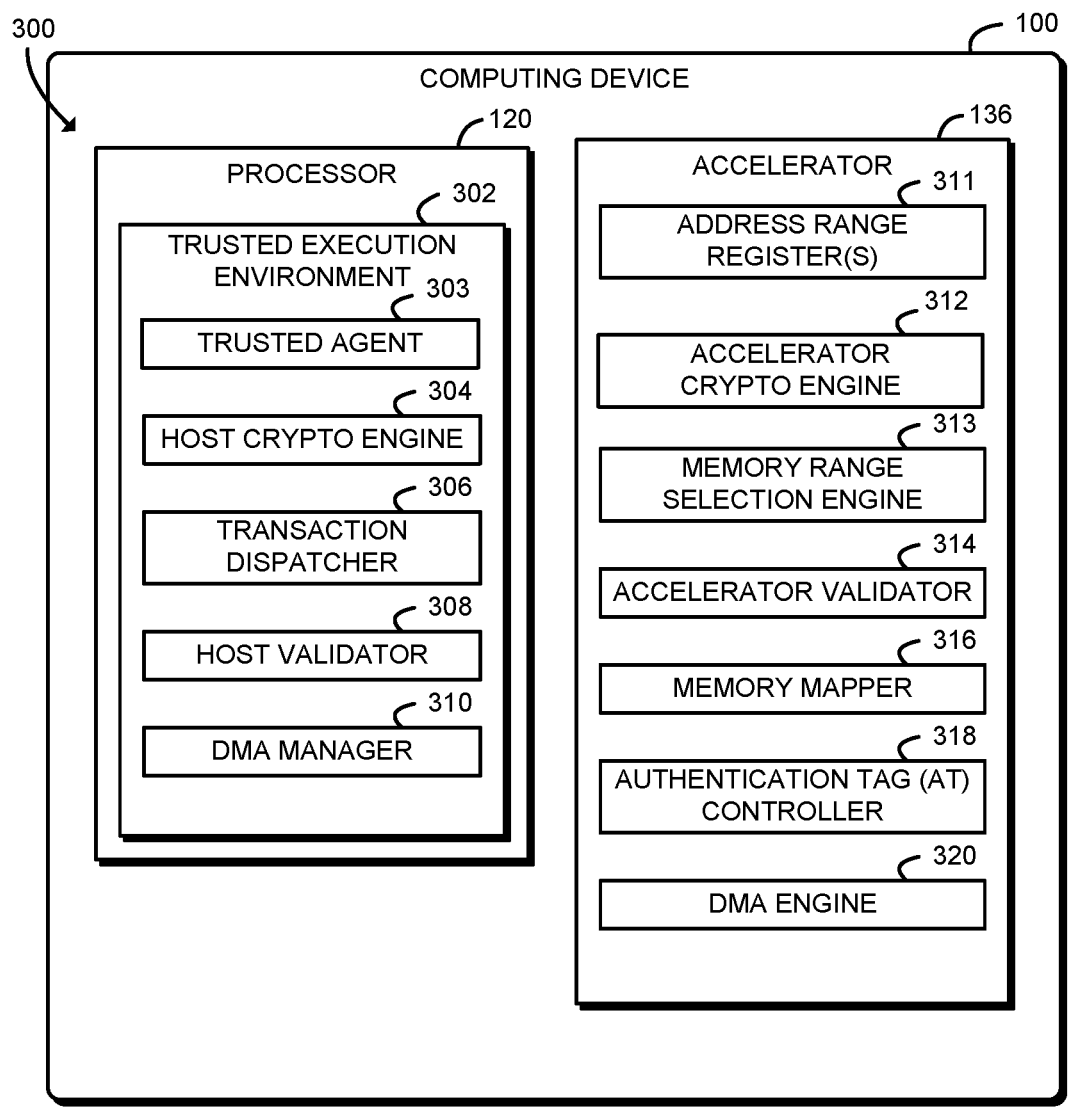
FIG. 3 is a simplified block diagram of at least one embodiment of an environment of the computing device of FIGS. 1-2.

Referring now to FIG. 3, in an illustrative embodiment, the computing device 100 establishes an environment 300 during operation. The illustrative environment 300 includes a trusted execution environment (TEE) 302 and the accelerator 136. The TEE 302 further includes a host cryptographic engine 304, a transaction dispatcher 306, a host validator 308, and a direct memory access (DMA) manager 310. The accelerator 136 includes an accelerator cryptographic engine 312, an accelerator validator 314, a memory mapper 316, an authentication tag (AT) controller 318, and a DMA engine 320. The various components of the environment 300 may be embodied as hardware, firmware, software, or a combination thereof. As such, in some embodiments, one or more of the components of the environment 300 may be embodied as circuitry or collection of electrical devices (e.g., host cryptographic engine circuitry 304, transaction dispatcher circuitry 306, host validator circuitry 308, DMA manager circuitry 310, accelerator cryptographic engine circuitry 312, accelerator validator circuitry 314, memory mapper circuitry 316, AT controller circuitry 318, and/or DMA engine circuitry 320). It should be appreciated that, in such embodiments, one or more of the host cryptographic engine circuitry 304, the transaction dispatcher circuitry 306, the host validator circuitry 308, the DMA manager circuitry 310, the accelerator cryptographic engine circuitry 312, the accelerator validator circuitry 314, the memory mapper circuitry 316, the AT controller circuitry 318, and/or the DMA engine circuitry 320 may form a portion of the processor 120, the I/O subsystem 124, the accelerator 136, and/or other components of the computing device 100. Additionally, in some embodiments, one or more of the illustrative components may form a portion of another component and/or one or more of the illustrative components may be independent of one another.

The TEE 302 may be embodied as a trusted execution environment of the computing device 100 that is authenticated and protected from unauthorized access using hardware support of the computing device 100, such as the secure enclave support 122 of the processor 120. Illustratively, the TEE 302 may be embodied as one or more secure enclaves established using Intel SGX technology. The TEE 302 may also include or otherwise interface with one or more drivers, libraries, or other components of the computing device 100 to interface with the accelerator 136.

The host cryptographic engine 304 is configured to generate an authentication tag (AT) based on a memory-mapped I/O (MMIO) transaction and to write that AT to an AT register of the accelerator 136. For an MMIO write request, the host cryptographic engine 304 is further configured to encrypt a data item to generate an encrypted data item, and the AT is generated in response to encrypting the data item. For an MMIO read request, the AT is generated based on an address associated with MMIO read request.

The transaction dispatcher 306 is configured to dispatch the memory-mapped I/O transaction (e.g., an MMIO write request or an MMIO read request) to the accelerator 136 after writing the calculated AT to the AT register. An MMIO write request may be dispatched with the encrypted data item.

The host validator 308 may be configured to verify that an MMIO write request succeeded in response dispatching the MMIO write request. Verifying that the MMIO write request succeeded may include securely reading a status register of the accelerator 136, securely reading a value at the address of the MMIO write from the accelerator 136, or reading an AT register of the accelerator 136 that returns an AT value calculated by the accelerator 136, as described below. For MMIO read requests, the host validator 308 may be further configured to generate an AT based on an encrypted data item included in a MMIO read response dispatched from the accelerator 136; read a reported AT from a register of the accelerator 136; and determine whether the AT generated by the TEE 302 matches the AT reported by the accelerator 136. The host validator 308 may be further configured to indicate an error if those ATs do not match, which provides assurance that data was not modified on the way from the TEE 302 to the accelerator 136.

The accelerator cryptographic engine 312 is configured to perform a cryptographic operation associated with the MMIO transaction and to generate an AT based on the MMIO transaction in response to the MMIO transaction being dispatched. For an MMIO write request, the cryptographic operation includes decrypting an encrypted data item received from the TEE 302 to generate a data item, and the AT is generated based on the encrypted data item. For an MMIO read request, the cryptographic operation includes encrypting a data item from a memory of the accelerator 136 to generate an encrypted data item, and the AT is generated based on that encrypted data item.

The accelerator validator 314 is configured to determine whether the AT written by the TEE 302 matches the AT determined by the accelerator 136. The accelerator validator 314 is further configured to drop the MMIO transaction if those ATs do not match. For MMIO read requests, the accelerator validator 314 may be configured to generate a poisoned AT in response to dropping the MMIO read request, and may be further configured to dispatch a MMIO read response with a poisoned data item to the TEE 302 in response to dropping the MMIO read request.

The memory mapper 316 is configured to commit the MMIO transaction in response to determining that the AT written by the TEE 302 matches the AT generated by the accelerator 136. For an MMIO write request, committing the transaction may include storing the data item in a memory of the accelerator 136. The memory mapper 316 may be further configured to set a status register to indicate success in response to storing the data item. For an MMIO read request, committing the transaction may include reading the data item at the address in the memory of the accelerator 136 and dispatching an MMIO read response with the encrypted data item to the TEE 302.

The DMA manager 310 is configured to securely write an initialization command to the accelerator 136 to initialize a secure DMA transfer. The DMA manager 310 is further configured to securely configure a descriptor indicative of a host memory buffer, an accelerator 136 buffer, and a transfer direction. The transfer direction may be host to accelerator 136 or accelerator 136 to host. The DMA manager 310 is further configured to securely write a finalization command to the accelerator 136 to finalize an authentication tag (AT) for the secure DMA transfer. The initialization command, the descriptor, and the finalization command may each be securely written and/or configured with an MMIO write request. The DMA manager 310 may be further configured to determine whether to transfer additional data in response to securely configuring the descriptor, the finalization command may be securely written in response to determining that no additional data remains for transfer.

The AT controller 318 is configured to initialize an AT in response to the initialization command from the TEE 302. The AT controller 318 is further configured to finalize the AT in response to the finalization command from the TEE 302.

The DMA engine 320 is configured to transfer data between the host memory buffer and the accelerator 136 buffer in response to the descriptor from the TEE 302. For a transfer from host to accelerator 136, transferring the data includes copying encrypted data from the host memory buffer and forwarding the plaintext data to the accelerator 136 buffer in response to decrypting the encrypted data. For a transfer from accelerator 136 to host, transferring the data includes copying plaintext data from the accelerator 136 buffer and forwarding encrypted data to the host memory buffer in response encrypting the plaintext data.

The accelerator cryptographic engine 312 is configured to perform a cryptographic operation with the data in response to transferring the data and to update the AT in response to transferring the data. For a transfer from host to accelerator 136, performing the cryptographic operation includes decrypting encrypted data to generate plaintext data. For a transfer from accelerator 136 to host, performing the cryptographic operation includes encrypting plaintext data to generate encrypted data.

The host validator 308 is configured to determine an expected AT based on the secure DMA transfer, to read the AT from the accelerator 136 in response to securely writing the finalization command, and to determine whether the AT from the accelerator 136 matches the expected AT. The host validator 308 may be further configured to indicate success if the ATs match and to indicate failure if the ATs do not match.

Figure 4:
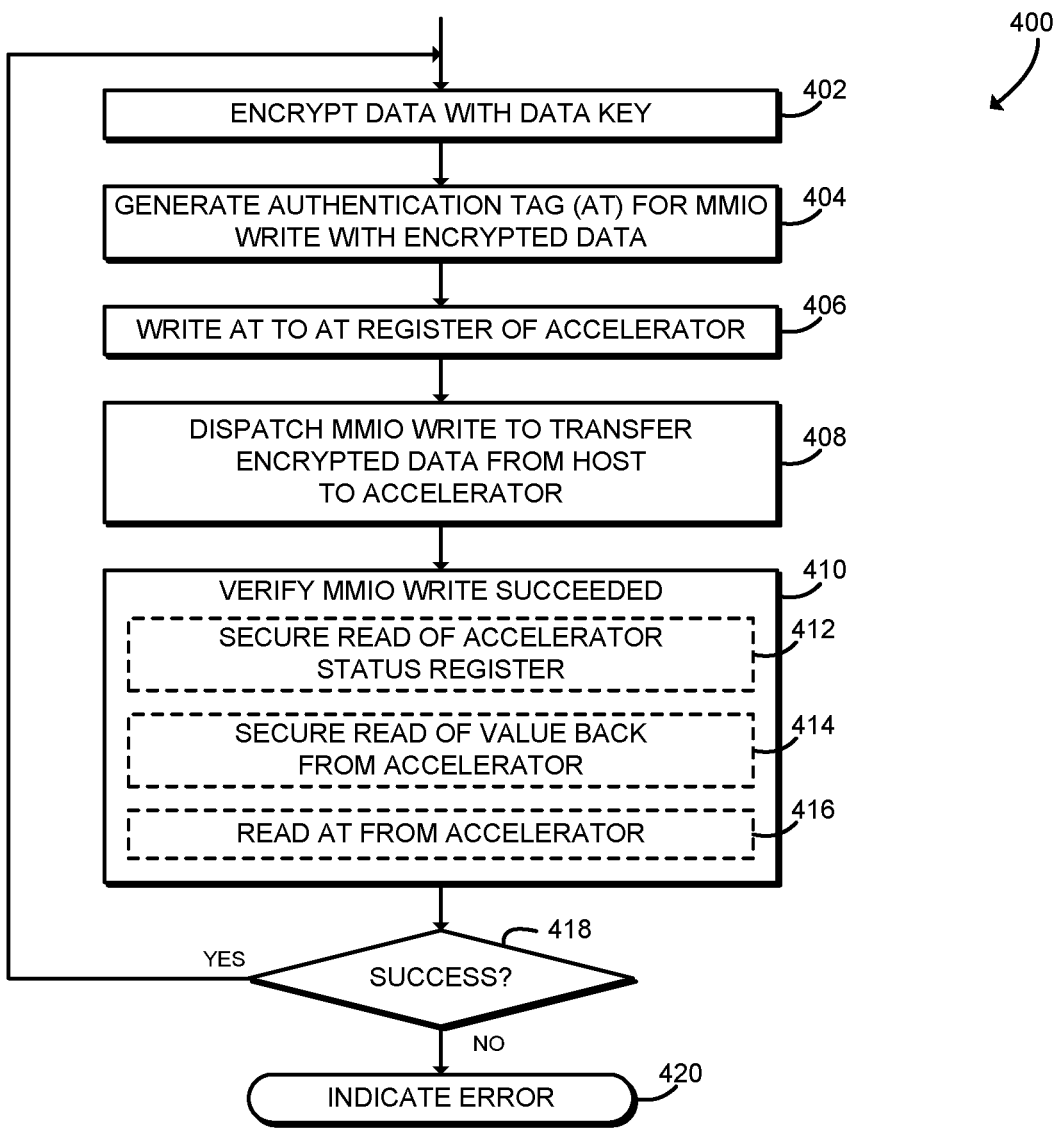
FIG. 4 is a simplified flow diagram of at least one embodiment of a method for secure memory-mapped I/O writes that may be executed by a computing device of FIGS. 1-3.

Referring now to FIG. 4, in use, the computing device 100 may execute a method 400 for secure memory-mapped I/O (MMIO) write requests. It should be appreciated that, in some embodiments, the operations of the method 400 may be performed by one or more components of the environment 300 of the computing device 100 as shown in FIG. 3, such as the trusted execution environment 302. The method 400 begins in block 402, in which the TEE 302 encrypts data with a data key. The data may be embodied as a 32-bit value, a 64-bit value, or other relatively small data item. For example, the data may be a value or values that are to be written to a register or other memory location of the accelerator 136 (e.g., a register 208 associated with an AFU 206). The data key may be securely provisioned to both the TEE 302 and the accelerator 136 ahead of time using any appropriate technique. The data is illustratively encrypted with the AES Galois/counter mode (AES-GCM) authenticated encryption algorithm. In other embodiments, the data may be encrypted with any other appropriate cryptographic algorithm.

In block 404, the TEE 302 generates an authentication tag (AT) for the MMIO write request with the encrypted data. As described above, the AT may be generated with the encrypted data using an authenticated encryption algorithm such as AES-GCM. The AT may be embodied as any hash, message authentication code, or other value that may be used to authenticate the encrypted data and additional authentication data. The additional authentication data may include, for example, an address associated with the MMIO write request, such as a memory address, register offset, or other addressing information.

In block 406, the TEE 302 writes the AT to an AT register of the accelerator 136. The AT may be written with an unsecure MMIO or other operation. For example, the AT may be embodied as a 128-bit value and may be written to the accelerator 136 with two 64-bit unsecure write operations. Note that if the AT is intercepted or otherwise modified by a malicious actor, then as described further below, the accelerator 136 will determine that the MMIO write is invalid and will drop the MMIO write.

In block 408, the TEE 302 dispatches the MMIO write request to transfer the encrypted data from the host (i.e., the TEE 302, an associated driver, or other software executed by the processor 120) to the accelerator 136. The MMIO write request may be dispatched using an unsecure MMIO engine 128 or other MMIO component of the computing device 100. As described below in connection with FIG. 5, a secure MMIO component of the accelerator 136 (e.g., the secure MMIO 202 of an FPGA 200) decrypts and verifies the MMIO write request transaction.

In block 410, the TEE 302 may verify that the MMIO write request succeeded. Additionally or alternatively, in certain situations there may be no need to verify that the MMIO write request succeeded, in which case the TEE 302 may omit verifying that the MMIO write request succeeded. For example, the TEE 302 may only verify MMIO write requests to registers of the accelerator 136 that could affect the reliability of results. As another example, if failure to successfully perform the MMIO write request can be detected later in a different operation, verification of the MMIO write request may be omitted.

The TEE 302 may use any appropriate technique to verify that the MMIO write request was successfully performed by the accelerator 136. In some embodiments, in block 412, the TEE 302 may securely read a status register of the accelerator 136. The status register may be set by the accelerator 136 if the MMIO write was performed successfully. To perform the secure read, the TEE 302 may execute a secure MMIO read request as described below in connection with FIGS. 6-7. In some embodiments, in block 414, the TEE 302 may securely read a value back from the accelerator 136 at the address of the MMIO write (e.g., read back the same register). The TEE 302 may compare the value read from the accelerator 136 with the original data item and determine whether those values match. The value may be read with a secure MMIO read request as described below in connection with FIGS. 6-7. Reading back the value may not be possible for registers or memory locations with side effects or for write-only registers or memory locations. In some embodiments, in block 416, the TEE 302 may read an AT from the accelerator 136 that is generated by the accelerator 136. The TEE 302 may compare the AT read from the accelerator 136 with the AT generated by the TEE 302 and determine whether those ATs match. The AT may be read with one or more unsecure MMIO read requests or other transfers. In some embodiments, each AT may be a 128-bit value, and thus reading the AT may require two 64-bit MMIO read operations. The AT does not need to be read securely, because by modifying an AT, an attacker could only create a denial of service attack, as verification will fail and the TEE 302 will consider the transfer to have failed.

In block 418, the TEE 302 checks whether the MMIO write request was completed successfully. If not, the method 400 branches to block 420, in which the TEE 302 may indicate an error or otherwise indicate that the MMIO write request was not successful. In response, the TEE 302 may halt, retry the MMIO write, or perform another operation. Referring back to block 418, if the MMIO write request was completed successfully, the method 400 loops back to block 402 to perform additional MMIO write requests.

Figure 5:
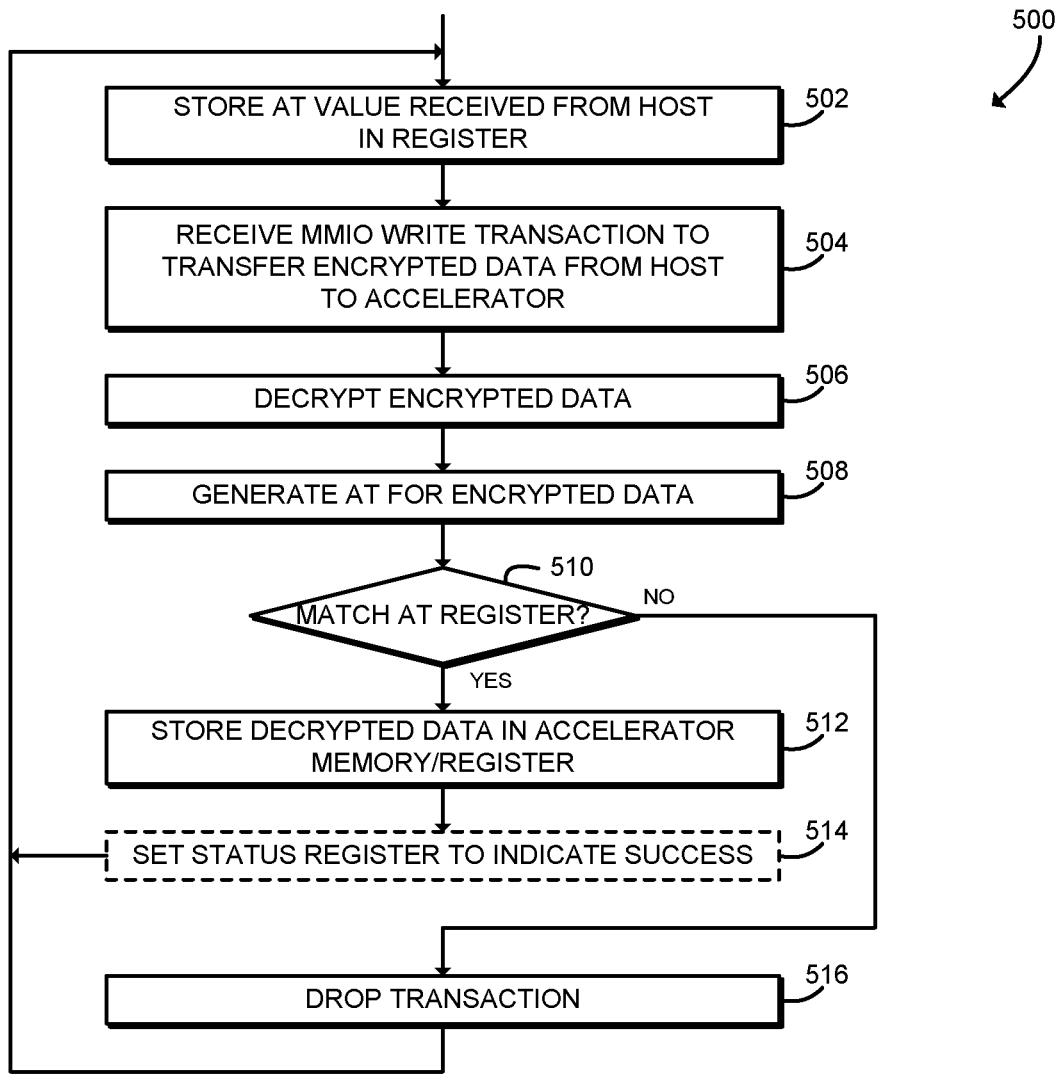
FIG. 5 is a simplified flow diagram of at least one embodiment of a method for secure memory-mapped I/O writes that may be executed by an accelerator device of FIGS. 1-3.

Referring now to FIG. 5, in use, the computing device 100 may execute a method 500 for secure MMIO write requests. It should be appreciated that, in some embodiments, the operations of the method 500 may be performed by one or more components of the environment 300 of the computing device 100 as shown in FIG. 3, such as the accelerator 136. The method 500 begins in block 502, in which the accelerator 136 stores an authentication tag (AT) value received from the TEE 302. As described above, the AT is generated by the TEE 302 based on the encrypted data item that is to be written to the accelerator 136. The AT may be written with an unsecure MMIO write or other operation. For example, the AT may be embodied as a 128-bit value and may be written to the accelerator 136 with two 64-bit unsecure write operations.

In block 504, the accelerator 136 receives an MMIO write request transaction to transfer encrypted data from the host (i.e., the TEE 302, an associated driver, or other software executed by the processor 120) to the accelerator 136. As described above, the MMIO write request may be received from an unsecure MMIO engine 128 or other MMIO component of the computing device 100. The encrypted data may be embodied as a 32-bit value, a 64-bit value, or other relatively small data item. The MMIO write request may include the encrypted data as well as an associated address such as a memory address, register offset, or other addressing information.

In block 506, the accelerator 136 decrypts the encrypted data using a data key. As described above, the data key may be securely provisioned to both the TEE 302 and the accelerator device 136 ahead of time using any appropriate technique. The data is illustratively decrypted with the AES Galois/counter mode (AES-GCM) authenticated decryption algorithm. In other embodiments, the data may be decrypted with any other appropriate cryptographic algorithm. The plaintext data generated from decryption may be a value or values that are to be written to a register or other memory location of the accelerator 136 (e.g., a register 208 associated with an AFU 206).

In block 508, the accelerator 136 generates an AT for the MMIO write request using the encrypted data received from the TEE 302. As described above, the AT may be generated based on the encrypted data using an authenticated encryption algorithm such as AES-GCM. The AT may be embodied as any hash, message authentication code, or other value that may be used to authenticate the encrypted data and additional authentication data. The additional authentication data may include, for example, the address associated with the MMIO write.

In block 510, the accelerator 136 determines whether the AT generated by the accelerator 136 matches the AT written by the TEE 302. If not, the method 500 branches to block 516, described below. If the AT values match, the method 500 advances to block 512.

In block 512, the accelerator 136 stores the decrypted, plaintext data in an accelerator 136 memory, register, or other storage location. For example, the plaintext data may be stored in a register 208 of an FPGA 200, in another memory 208 included in the FPGA 200, or in an external memory device coupled to the FPGA 200. The register or storage location may be identified with the address of the MMIO write transaction. After being stored, the plaintext data may be processed or otherwise accessed by the accelerator 136, for example by an AFU 206 of the FPGA 200. In some embodiments, in block 514 the accelerator 136 may set a status register to indicate the MMIO write request was performed successfully. As described above, the TEE 302 may securely read the status register to verify the MMIO write request. After committing the MMIO write request and in some embodiments setting the status register, the method 500 loops back to block 502 to perform additional MMIO write requests.

Referring back to block 510, if the AT generated by the accelerator 136 and the AT written by the TEE 302 do not match, then the method 500 branches to block 516, in which the accelerator 136 drops the MMIO write transaction. The accelerator 136 may also set a status register to indicate that the MMIO write request was not performed successfully. The plaintext value is not written to the memory of the accelerator 136. Thus, the accelerator 136 may be protected from certain malicious attacks. For example, a malicious actor may submit a false MMIO write transaction to the accelerator 136. In that circumstance, an AT value written by the TEE 302 would not match the AT value calculated for the false MMIO transaction, and the malicious actor would not be able to calculate a correct AT value because the data key is secret. As another example, a malicious actor may write a false AT value to the accelerator 136. In that circumstance, the AT value calculated by the accelerator 136 based on the MMIO write request (e.g., the MMIO write request dispatched by the TEE 302) would not match the false AT value, and the MMIO write request would be dropped. After dropping the MMIO write transaction, the method 500 loops back to block 502 to perform additional MMIO write requests.

Figure 6:
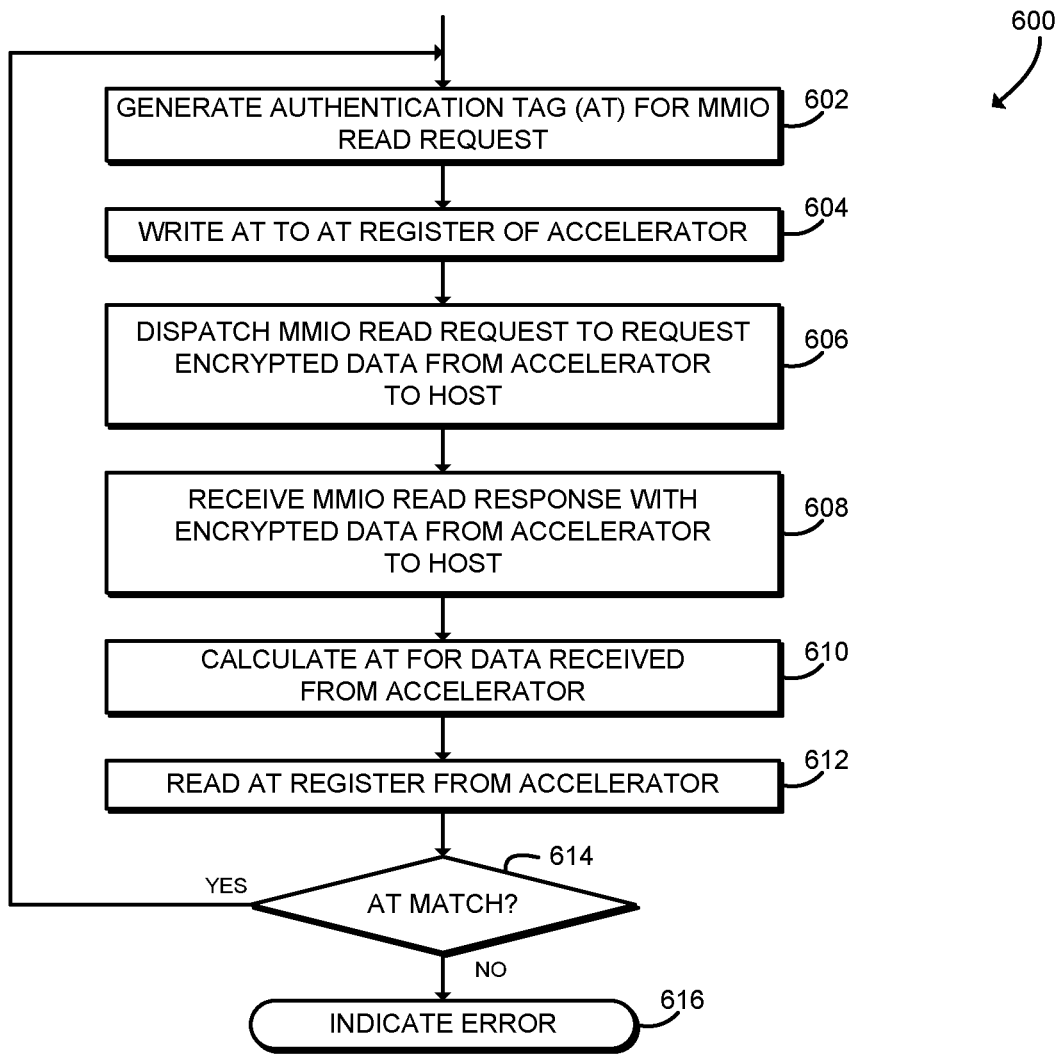
FIG. 6 is a simplified flow diagram of at least one embodiment of a method for secure memory-mapped I/O reads that may be executed by a computing device of FIGS. 1-3.

Referring now to FIG. 6, in use, the computing device 100 may execute a method 600 for secure memory-mapped I/O read operations. As described further below, an MMIO read operation includes two MMIO transactions, an MMIO read request and an MMIO read response. It should be appreciated that, in some embodiments, the operations of the method 600 may be performed by one or more components of the environment 300 of the computing device 100 as shown in FIG. 3, such as the trusted execution environment 302. The method 600 begins in block 602, in which the TEE 302 generates an authentication tag (AT) for an MMIO read request. The AT may be generated using an authenticated encryption algorithm such as AES-GCM. Instead of generating the AT based on encrypted data, the AT may be based on a known value, such as a block of 128 "zero" bits or other predetermined constant. The AT may be embodied as any hash, message authentication code, or other value that may be used to authenticate the supplied value and additional authentication data. The additional authentication data may include, for example, an address associated with the MMIO read request, such as a memory address, register offset, or other addressing information.

In block 604, the TEE 302 writes the AT to an AT register of the accelerator 136. The AT may be written with an unsecure MMIO write or other operation. For example, the AT may be embodied as a 128-bit value and may be written to the accelerator 136 with two 64-bit unsecure write operations. Note that if the AT is intercepted or otherwise modified by a malicious actor, then as described further below, the accelerator 136 will determine that the MMIO read request is invalid and will drop the MMIO read request.

In block 606, the TEE 302 dispatches the MMIO read request to the accelerator 136. The MMIO read request may be dispatched using an unsecure MMIO engine 128 or other MMIO component of the computing device 100. As described below in connection with FIG. 5, a secure MMIO component of the accelerator 136 (e.g., the secure MMIO 202 of an FPGA 200) decrypts and verifies the MMIO read request transaction. If the MMIO read request is successfully verified, the accelerator 136 dispatches an MMIO read response.

In block 608, the TEE 302 receives an MMIO read response from the accelerator 136. As described further below, the MMIO read response may include encrypted data that was originally read by the accelerator 136 from a memory, register, or other storage of the accelerator 136 and then encrypted by the accelerator 136. The MMIO read response may be received using the unsecure MMIO engine 128 or other MMIO component of the computing device 100.

In block 610, the TEE 302 calculates an AT for the encrypted data received from the accelerator 136 with the MMIO read response. As described above, the AT may be generated with the encrypted data using an authenticated encryption algorithm such as AES-GCM. The AT may be embodied as any hash, message authentication code, or other value that may be used to authenticate the encrypted data and additional authentication data. The additional authentication data may include, for example, an address associated with the MMIO read response, such as a memory address, register offset, or other addressing information.

In block 612, the TEE 302 reads an AT register from the accelerator 136. The AT register includes an AT that was generated by the accelerator 136 based on the MMIO read response. The AT may be read with one or more unsecure MMIO reads. For example, the AT may be a 128-bit value, reading the AT may require two 64-bit MMIO unsecure read operations. In block 614, the TEE 302 compares the AT read from the accelerator 136 with the AT generated by the TEE 302 and determines whether those ATs match. If the ATs do not match, then the method 600 branches to block 616, in which the TEE 302 may indicate an error or otherwise indicate that the MMIO read request was not successful. In response, the TEE 302 may halt, retry the MMIO read request, or perform another operation. Referring back to block 614, if the ATs match, the method 600 loops back to block 602 to perform additional MMIO read requests. The TEE 302, an application, or other component of the computing device 100 may decrypt the encrypted data included with the MMIO read response and otherwise process the received data.

Figure 7:
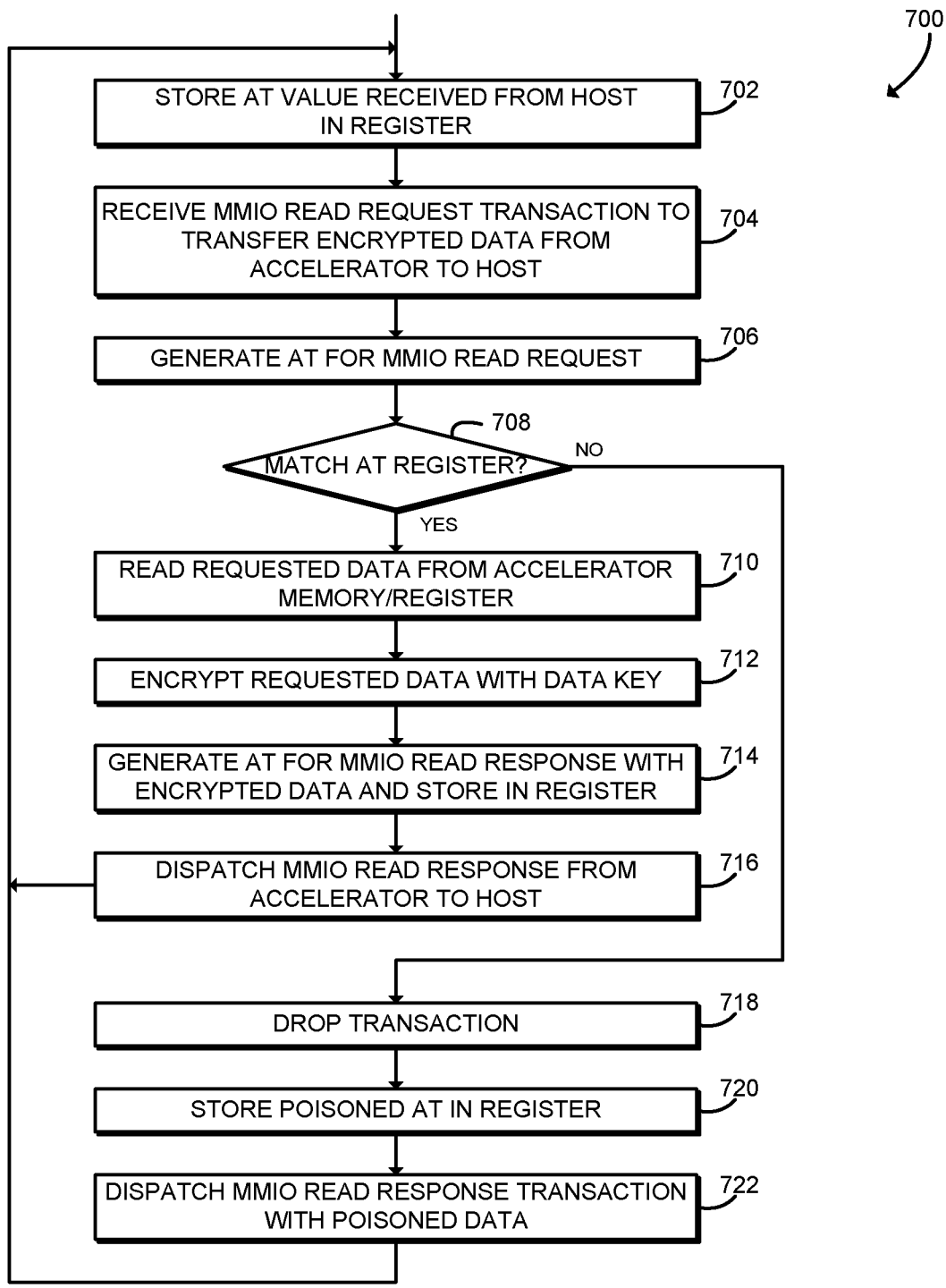
FIG. 7 is a simplified flow diagram of at least one embodiment of a method for secure memory-mapped I/O reads that may be executed by the accelerator device of FIGS. 1-3.

Referring now to FIG. 7, in use, the computing device 100 may execute a method 700 for secure memory-mapped I/O read operations. It should be appreciated that, in some embodiments, the operations of the method 700 may be performed by one or more components of the environment 300 of the computing device 100 as shown in FIG. 3, such as the accelerator 136. The method 700 begins in block 702, in which the accelerator 136 stores an authentication tag (AT) value received from the TEE 302. As described above, the AT is generated by the TEE 302 based on an MMIO read request. The AT may be written with an unsecure MMIO or other operation. For example, the AT may be embodied as a 128-bit value and may be written to the accelerator 136 with two 64-bit unsecure write operations.

In block 704, receives an MMIO read request that requests a transfer of encrypted data from the accelerator 136 to the host (i.e., to the TEE 302, an associated driver, or other software executed by the processor 120). As described above, the MMIO read request may be received from an unsecure MMIO engine 128 or other MMIO component of the computing device 100. The requested data may be embodied as a 32-bit value, a 64-bit value, or other relatively small data item. The MMIO read request may specify associated address such as a memory address, register offset, or other addressing information of the requested data.

In block 706, the accelerator 136 generates an AT for the MMIO read request based on the MMIO read request received from the TEE 302. As described above, the AT may be generated using an authenticated encryption algorithm such as AES-GCM. Instead of generating the AT based on encrypted data, the AT may be based on a known value, such as a block of 128 "zero" bits or other predetermined constant. The AT may be embodied as any hash, message authentication code, or other value that may be used to authenticate the supplied value and additional authentication data. The additional authentication data may include, for example, an address associated with the MMIO read request, such as a memory address, register offset, or other addressing information.

In block 708, the accelerator 136 determines whether the AT generated by the accelerator 136 matches the AT written by the TEE 302. If not, the method 700 branches to block 718, described below. If the AT values match, the method 700 advances to block 710.

In block 710, the accelerator 136 reads the requested plaintext data from a memory, register, or other storage location of the accelerator 136. For example, the plaintext data may be read from a register 208 of an FPGA 200, from another memory 208 included in the FPGA 200, or from an external memory device coupled to the FPGA 200. The register or storage location may be identified with the address of the MMIO read request. The plaintext data may include acceleration results or other data generated by the accelerator 136, for example by an AFU 206 of the FPGA 200.

In block 712, the accelerator 136 encrypts the plaintext data using a data key. As described above, the data key may be securely provisioned to both the TEE 302 and the accelerator device 136 ahead of time using any appropriate technique. The data is illustratively encrypted with the AES Galois/counter mode (AES-GCM) authenticated encryption algorithm. In other embodiments, the data may be encrypted with any other appropriate cryptographic algorithm. The encrypted data generated from encryption may be a value or values that are to be returned to the TEE 302 as an MMIO read response.

In block 714, the accelerator 136 generates an AT for the MMIO read response using the encrypted data. As described above, the AT may be generated with the encrypted data using an authenticated encryption algorithm such as AES-GCM. The AT may be embodied as any hash, message authentication code, or other value that may be used to authenticate the encrypted data and additional authentication data. The additional authentication data may include, for example, the address associated with the MMIO read response.

In block 716, the accelerator 136 dispatches the MMIO read response to the TEE 302. The MMIO read response includes the encrypted data generated by the accelerator 136. As described above, the MMIO read response may be received by the TEE 302 using the unsecure MMIO engine 128 or other MMIO component of the computing device 100. Also as described above, the TEE 302 may verify the MMIO read response by reading the AT calculated by the accelerator 136 from one or more registers of the accelerator 136. After dispatching the MMIO read response, the method 700 loops back to block 702 to perform additional MMIO read operations.

Referring back to block 708, if the AT generated by the accelerator 136 and the AT written by the TEE 302 do not match, then the method 500 branches to block 718, in which the accelerator 136 drops the MMIO read request transaction. The accelerator 136 does not read the requested value from the memory or other storage of the accelerator 136. In block 720, in some embodiments, the accelerator 136 may store a poisoned AT value in an AT register. The poisoned AT value may be a predetermined value, an AT generated based on a predetermined value, or another incorrect AT value. As described above, the TEE 302 reads the AT register to verify the MMIO read response received from the accelerator 136. The TEE 302 may determine that the MMIO read request was dropped based on the poisoned AT value, for example, by determining that the poisoned AT value does not match an AT value calculated over the MMIO read response. Similarly, in some embodiments, in block 722 the accelerator 136 may dispatch an MMIO read response transaction with poisoned data. The poisoned data may be embodied as, for example, a predetermined value or other constant that may be detected by the TEE 302. As another example, the poisoned data may be an arbitrary value that, when verified by the TEE 302, does not match the poisoned AT value. After dropping the MMIO read request transaction, the method 700 loops back to block 702 to continue processing MMIO read operations.

Figure 8:
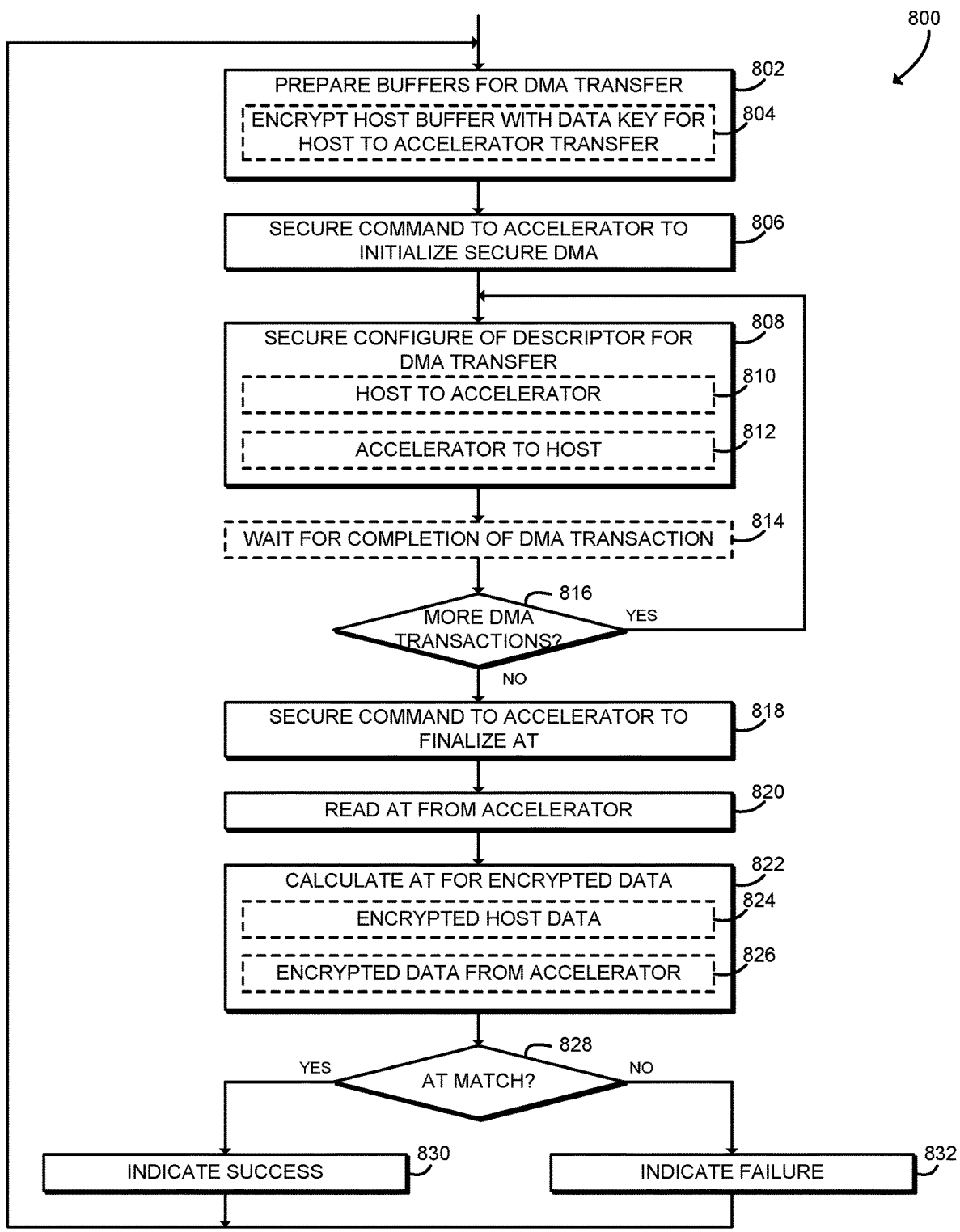
FIG. 8 is a simplified flow diagram of at least one embodiment of a method for secure direct memory access transactions that may be executed by the computing device of FIGS. 1-3.

Referring now to FIG. 8, in use, the computing device 100 may execute a method 800 for secure direct memory access (DMA) transfers. It should be appreciated that, in some embodiments, the operations of the method 800 may be performed by one or more components of the environment 300 of the computing device 100 as shown in FIG. 3, such as the trusted execution environment 302. The method 800 begins in block 802, in which the TEE 302 prepares one or more memory buffers for a DMA transfer. For example, the TEE 302 may allocate a circular buffer in the host memory 130. As described further below, the buffer may be divided into multiple blocks of data that may each be transferred in a single DMA transaction. For example, the buffer may include multiple 512-bit blocks. In some embodiments, the buffer may be aligned on a block boundary in the memory 130 (e.g., 64-byte aligned). If the buffer is not aligned in memory, data located before the first block boundary and/or after the last block boundary may be transferred using one or more secure MMIO operations, as described above in connection with FIGS. 4-7. In some embodiments, in block 804, the TEE 302 may encrypt data in the host buffer with a data key for a host to accelerator 136 transfer. The data key may be securely provisioned to both the TEE 302 and the accelerator device 136 ahead of time using any appropriate technique. The data is illustratively encrypted with the AES Galois/counter mode (AES-GCM) authenticated encryption algorithm. In other embodiments, the data may be encrypted with any other appropriate cryptographic algorithm.

In block 806, the TEE 302 securely commands the accelerator 136 to initialize a secure DMA transfer. The TEE 302 may, for example, perform a secure MMIO write to a register of the accelerator 136 to cause the accelerator 136 to initialize the secure DMA transfer. As described further below, the accelerator 136 may initialize an authentication tag (AT) and/or other state data in response to the command to initialize the secure DMA transfer.

In block 808, the TEE 302 securely configures a descriptor for the DMA transfer. The TEE 302 may, for example, perform one or more secure MMIO writes to a register, command buffer, or other address of the accelerator 136 to provide the descriptor. The descriptor includes data describing the secure DMA transaction, including a source address, a destination address, a length, and a direction of transfer. The descriptor may also include additional data, such as a last flag that instructs the accelerator 136 to raise an interrupt or otherwise notify the TEE 302 after performing the DMA transaction. In some embodiments, in block 810 the descriptor may indicate a host to accelerator 136 transfer. In those embodiments the source address may identify a host buffer in the memory 130 that includes encrypted data, and the destination address may identify an accelerator buffer in a memory of the accelerator 136. In some embodiments, in block 812 the descriptor may indicate an accelerator 136 to host transfer. In those embodiments the source address may identify an accelerator buffer in a memory of the accelerator 136, and the destination address may identify a host buffer in the memory 130.

In some embodiments, the TEE 302 may program multiple descriptors securely and then instruct the accelerator 136 to start transferring data. In those embodiments, the accelerator 136 will read the first descriptor and perform the transfer, and then read the second descriptor and perform the transfer, and so on, until the accelerator 136 has completed transfers for all programmed descriptors. The accelerator 136 may then ask the TEE 302 if there are more transfers. The transfers will thus continue until the TEE 302 acting as master has completed all transfers. At that point, the TEE 302 will issue a finalize command, as described further below. After configuring the descriptor or descriptors, the accelerator 136 performs the secure DMA transaction and updates the corresponding AT as described further below in connection with FIG. 9.

In some embodiments, in block 814 the TEE 302 may wait for completion of the secure DMA transaction. For example, in some embodiments the TEE 302 may wait for an interrupt raised by the accelerator 136 or the TEE 302 may poll for a completion. In block 816, the TEE 302 determines whether additional DMA transactions remain to be executed. If additional DMA transactions remain for transfer, the method 500 loops back to block 808 to continue configuring descriptors for DMA transactions. For example, as described above, in some embodiments the source buffer may include multiple 512-bit blocks that may each be transferred in a single DMA transaction. The TEE 302 may continue to configure descriptors for each block until the entire buffer is transferred. Continuing that example, the TEE 302 may set the last flag for the last descriptor to be transferred and wait for an interrupt from the accelerator 136, indicating that all blocks have been transferred. As another example, the TEE 302 may divide the buffer into two sub-buffers, or ping-pong buffers. The TEE 302 may configure descriptors for one of the sub-buffers and set the last flag for the last descriptor in the sub-buffer. On receiving the interrupt, the TEE 302 may similarly configure the descriptors of the other sub-buffer. In that fashion, the TEE 302 may ensure that entries in a circular buffer are not overwritten and that an interrupt will not be lost, because at most one of the descriptors in flight has the last flag set. Referring back to block 816, if no more DMA transactions remain to be executed, the method 800 advances to block 818.

In block 818, the TEE 302 securely commands the accelerator 136 to finalize the AT. As described above, the TEE 302 may, for example, perform a secure MMIO write to a register of the accelerator 136 to cause the accelerator 136 to finalize the AT. The accelerator 136 may finalize the AT as described below in connection with FIG. 9.

In block 820, the TEE 302 reads the AT from the accelerator 136. The TEE 302 may read, for example, an AT register that includes an AT generated by the accelerator 136 based on the DMA transactions performed by the accelerator 136. The AT may be read with one or more unsecure MMIO reads. For example, the AT may be a 128-bit value, reading the AT may require two 64-bit MMIO unsecure read operations.

In block 822, the TEE calculates an expected AT for encrypted data associated with the secure DMA transfer. As described above, the AT may be generated with the encrypted data using an authenticated encryption algorithm such as AES-GCM. The AT may be embodied as any hash, message authentication code, or other value that may be used to authenticate the encrypted data and additional authentication data. The encrypted data used to generate the AT depends on the direction of transfer. In some embodiments, in block 824, the AT may be generated based on encrypted host data in the host buffer for a host to accelerator 136 transfer. The encrypted host data may be generated, for example, by the TEE 302, an application, or other entity of the computing device 100. In some embodiments, in block 826, the AT may be generated based on encrypted data received from the accelerator 136 for an accelerator 136 to host transfer.

In block 828, the TEE 302 determines whether the AT read from the accelerator 136 matches the expected AT. If so, the method 800 branches to block 830, in which the TEE 302 may indicate that the secure DMA transfer was completed successfully. The method 800 then loops back to block 802 to perform additional secure DMA transfers. Referring back to block 828, if the ATs do not match, then the method 800 branches to block 832, in which the TEE 302 may indicate a failure or otherwise indicate that the secure DMA transfer was not completed successfully. The TEE 302 may halt, retry the DMA transaction, or perform another operation. The method 800 may then loop back to block 802 to perform additional secure DMA transfers.

Figure 9:
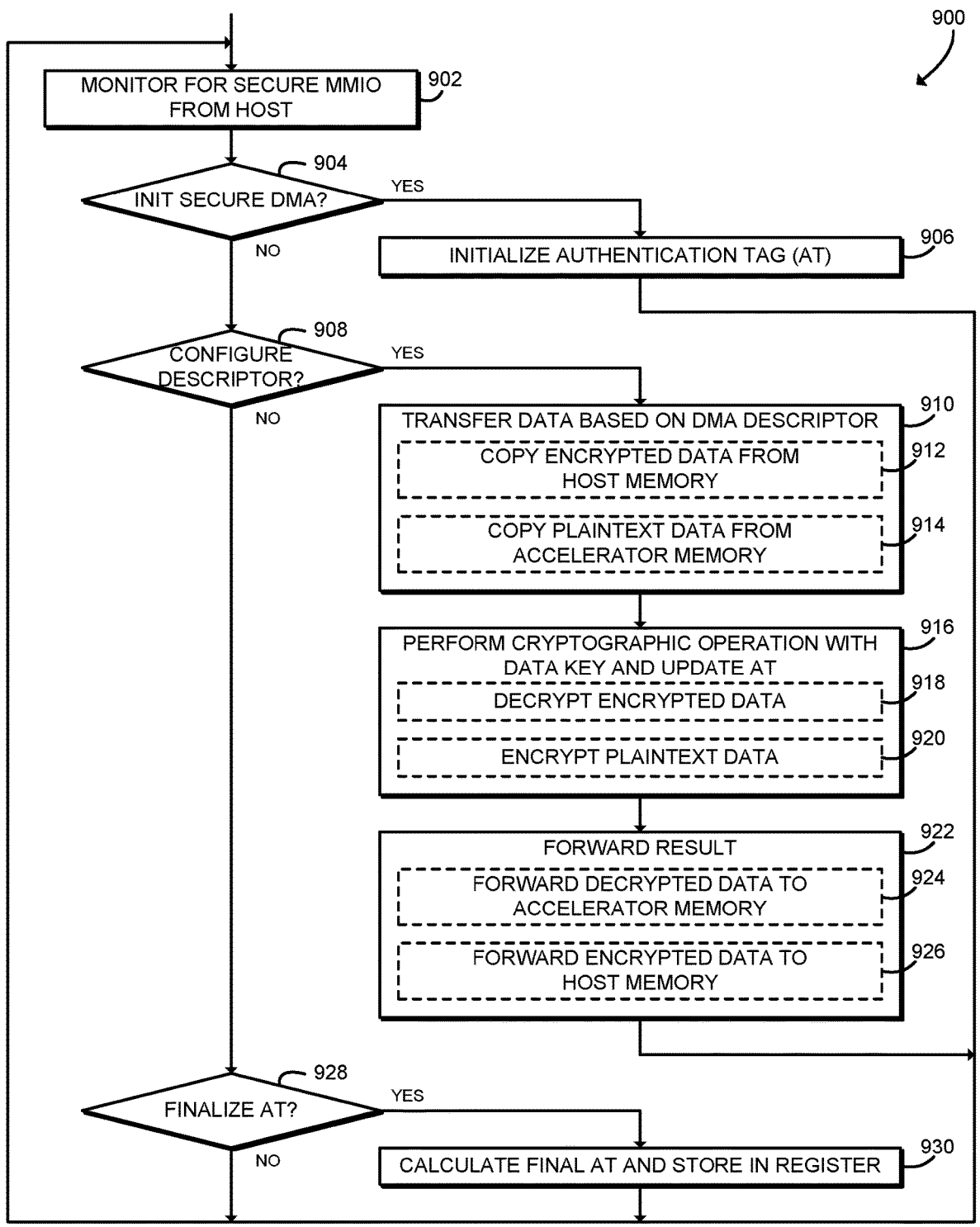
FIG. 9 is a simplified flow diagram of at least one embodiment of a method for secure direct memory access transactions that may be executed by the accelerator device of FIGS. 1-3.

Referring now to FIG. 9, in use, the computing device 100 may execute a method 900 for secure direct memory access transfers. It should be appreciated that, in some embodiments, the operations of the method 900 may be performed by one or more components of the environment 300 of the computing device 100 as shown in FIG. 3, such as the accelerator 136. The method 900 begins in block 902, in which the accelerator 136 monitors for secure commands received from the host (e.g., from the TEE 302). For example, the accelerator 136 may monitor for secure MMIO write requests to one or more registers, descriptor queues, or other memory locations of the accelerator device 136.

In block 904, the accelerator 136 determines whether a command to initialize a secure DMA transfer has been received. If not, the method 900 advances to block 908, described below. If a command to initialize the secure DMA transfer is received, the method 900 branches to block 906, in which the accelerator 136 initializes an authentication tag (AT). The accelerator 136 may, for example, initialize one or more registers, start one or more encryption pipelines, pre-calculate masks, or otherwise prepare the accelerator 136 for calculating AT values. After initializing the AT, the method 900 loops back to block 902 to continue monitoring for commands.

In block 908, the accelerator 136 determines whether a descriptor has been configured. If not, the method 900 advances to block 928, described below. If a descriptor has been configured, the method 900 branches to block 910, in which the accelerator 136 transfers data by executing a DMA transaction based on the descriptor. The accelerator 136 may transfer the data, for example, using one or more DMA engines or other components of the accelerator 136. The particular data transferred depends on the direction of transfer, which is indicated by the descriptor. The descriptor also provides a source address and a destination address for the transfer. In some embodiments, for host to accelerator 136 transfers, in block 912 the accelerator 136 may copy encrypted data from the host memory 130 to the accelerator 136. In some embodiments, for accelerator 136 to host transfers, in block 914 the accelerator 136 may copy plaintext data from a memory, register, or other storage of the accelerator 136.

In block 916, the accelerator 136 performs a cryptographic operation on the transferred data using a data key. The accelerator 136 may, for example, intercept the data transfer on a cache-coherent interconnect or other internal interconnect of the accelerator 136. As described above, the data key may be securely provisioned to both the TEE 302 and the accelerator 136 ahead of time using any appropriate technique. The cryptographic operation is illustratively an AES Galois/counter mode (AES-GCM) authenticated cryptographic algorithm. The accelerator 136 also updates the AT based on encrypted data associated with the DMA transfer. The particular cryptographic operation performed depends on the direction of the transfer. In some embodiments, for host to accelerator 136 transfers, in block 918 the accelerator 136 decrypts encrypted data received from the host to recover the plaintext data. The accelerator 136 updates the AT based on the encrypted data received from the host. In some embodiments, for accelerator 136 to host transfers, in block 920 the accelerator 136 encrypts plaintext data from the accelerator 136 memory and generates the encrypted data. The accelerator 136 updates the AT based on the encrypted data generated by the accelerator 136.

In block 922, the accelerator 136 forwards the results of the cryptographic operation to the appropriate destination. The accelerator 136 may, for example, forward the results on the cache-coherent interconnect or other internal interconnect of the accelerator 136. Both the particular data forwarded and the destination depend on the direction of the transfer. In some embodiments, for host to accelerator 136 transfers, in block 924 the accelerator 136 forwards the decrypted, plaintext data to the memory of the accelerator 136. After the plaintext data is stored in the accelerator 136 memory, the accelerator 136 may process the data, for example with an AFU 206 of the FPGA 200. In some embodiments, for accelerator 136 to host transfers, in block 926 the accelerator 136 forwards the encrypted data to the host memory 130. The encrypted data may be stored in a host buffer in the memory 130. After transfer, the encrypted data may be copied, decrypted, and/or otherwise processed by the TEE 302, by an application, or by another component of the computing device 100. After forwarding the results of the cryptographic operation, the method 900 loops back to block 902 to continue monitoring for commands.

In block 928, the accelerator 136 determines whether a command to finalize the AT has been received. If not, the method 900 loops back to block 902 to continue monitoring for commands. If a command to finalize the AT was received, the method 900 branches to block 930, in which the accelerator 136 finalizes the AT and stores the final AT value in a register. The accelerator 136 may perform any appropriate calculation to finalize the AT. For example, the AT may be updated based on the final length of all of the DMA transfers. As described above, the final AT value may be read by the TEE 302 to verify that the secure DMA transfer was performed successfully. After storing the AT value, the method 900 loops back to block 902 to continue monitoring for commands.

It should be appreciated that, in some embodiments, the methods 400, 500, 600, 700, 800, and/or 900 may be embodied as various instructions stored on a computer-readable media, which may be executed by the processor 120, the I/O subsystem 124, the accelerator 136, and/or other components of the computing device 100 to cause the computing device 100 to perform the respective method 400, 500, 600, 700, 800, and/or 900. The computer-readable media may be embodied as any type of media capable of being read by the computing device 100 including, but not limited to, the memory 130, the data storage device 132, firmware devices, other memory or data storage devices of the computing device 100, portable media readable by a peripheral device 138 of the computing device 100, and/or other media.

In a virtualized computing environment, physical computing devices can be partitioned into multiple virtual devices. Different users (i.e., different virtual machines (VMs)) running on one or more CPUs may be assigned different virtual devices by the operating system (OS) and/or the virtual machine manager (VMM). Applications which execute in a virtualized computing environment rely on the OS and the VMM to provide exclusive (i.e., protected) access to a virtual device, such that the application's secrets may be shared securely with the virtual device. In various techniques for isolation described above, the processors (i.e., CPUs) of a computing device can access the memory of devices through memory mapped input/output (MMIO) requests. The OS and/or the VMM may manage isolation between the VMs by mapping a portion of (or all) the physical memory address space of the virtual device to a single VM, such that only one VM has access to that portion of the physical memory space. However, in some instances, an application may not have a relationship of trust with either the OS or the VMM, and therefore the application cannot trust that data shared with a virtual device executing on a physical device will not be accessed or modified by the OS and VMM. Or, that the OS or VMM will not give access to the physical memory space in the device assigned to the application to other VMs.

To address these and other issues, described herein are techniques to provide cryptographic separation in a virtual computing environment. Such techniques may be useful when an application cannot trust one or more of the OS, VMM or the other VMs, as commonly is the case in a data center environment. In some examples, hardware in a shared physical device may configure multiple sets of address ranges in memory for isolation. One or more address ranges may be unprotected (i.e., accessible by multiple users of the shared physical device). In addition, one or more sets of address ranges of the memory may have access cryptographically restricted, each be associated with different cryptographic keys. Each set of mutually trusted application-device pairs is assigned a different key by a trusted agent, or an application can select a key. The application may use the key to generate an authentication tag, which may be provided to the shared device.

The application may target an address with an MMIO request. Hardware in the shared physical device compares the target address in the MMIO request to the address ranges to select a cryptographic key and generates an authentication tag using the cryptographic key. If the generated authentication tag matches the authentication tag received from the application, then the MMIO request may be executed. By contrast, if the authentication tags do not match then the MMIO request may be denied and an error may be generated and may be reported.

In some examples the techniques to implement cryptographic separation of MMIO requests may be implemented in a computing environment such as that depicted in FIG. 1 through FIG. 3, described above, and may modify the operations depicted in FIGS. 4-9, described above. Components, architectures, and techniques to implement cryptographic separation of MMIO requests in virtual computing environments are described in greater detail below with reference to FIGS. 10-12.

Figure 10:
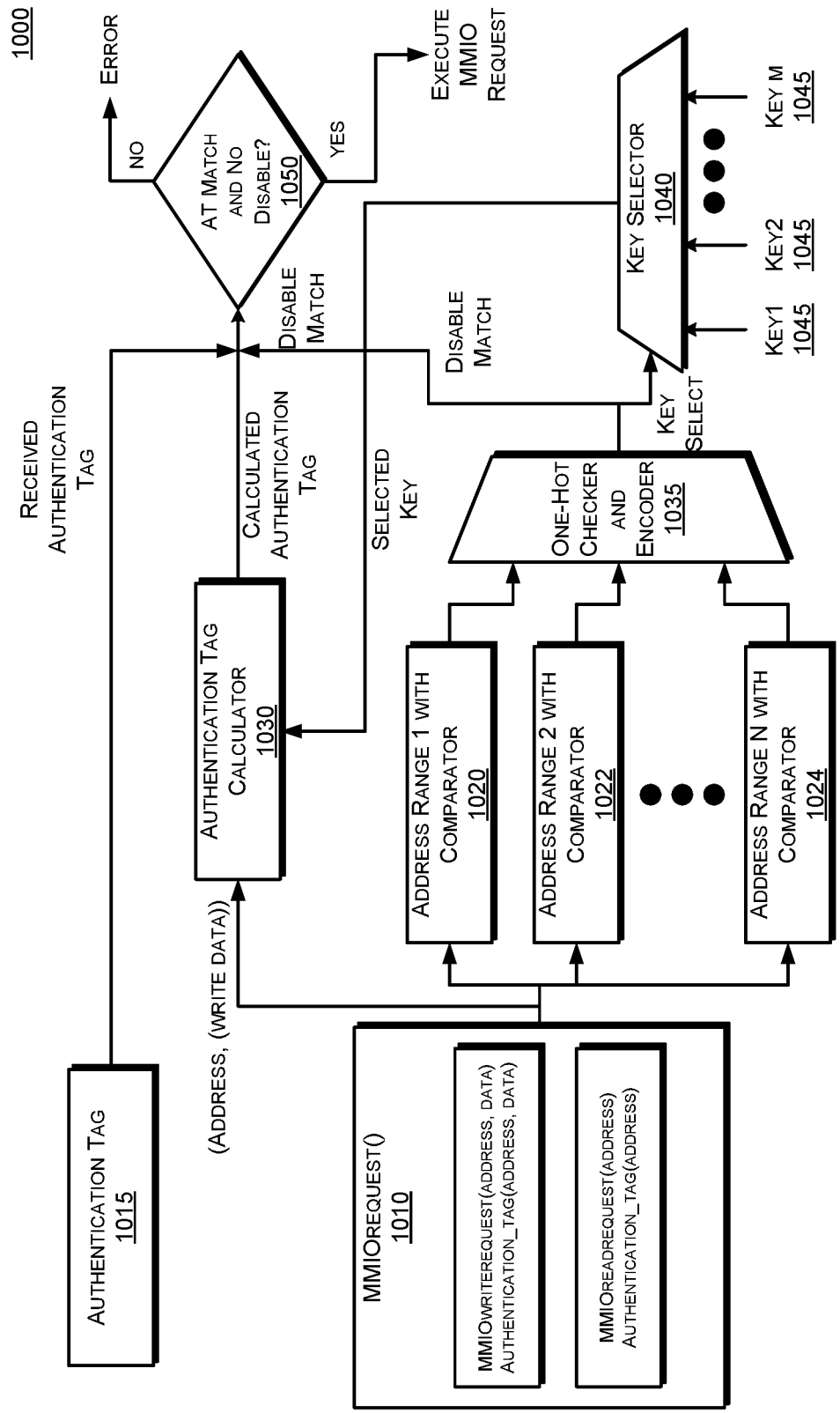
FIG. 10 is a schematic illustration of components and operations to provide secure direct memory access transactions in a virtualized computing environment, according to embodiments.

FIG. 10 is a schematic illustration of components and operations to provide secure direct memory access transactions in a virtualized computing environment 1000, according to embodiments. In some examples the address range(s) are cryptographically protected such that one cryptographic key may be selected from multiple different cryptographic keys Referring to FIG. 10, in some examples an MMIO request 1010 and an authentication tag (AT) 1015 may be received. As described above, the MMIO request 1010 and authentication tag (AT) 1015 may be received in the accelerator 136 and may be either a MMIO write request transaction or an MMIO read request transaction. An MMIO write request transaction and the associated authentication tag will comprise a target memory address for a memory location in the device and data associated with the MMIO write request. As described above, the MMIO write request may be received from an MMIO engine as in operation 408 and or other MMIO component of the computing device. The encrypted data may be embodied as a 32-bit value, a 64-bit value, or other relatively small data item. The MMIO write request may include the encrypted data as well as an associated address such as a memory address, register offset, or other addressing information. An MMIO read request transaction and the associated authentication tag may include a target memory address for the read request transaction. As described above with reference to operation 606, the target address associated with the MMIO read request may comprise additional data, such as a memory address, register offset, or other addressing information.

The target address associated with the MMIO request is input into one or more comparators 1020, 1022, 1024, each of which generate an output signal indicative of whether the target address falls within a specified address range. The one-hot checker and encoder 1035 generates a key select signal that corresponds to the address range that includes the target address. The key select signal generated by the one-hot checker and encoder 1035 will select a key associated to the address of the MMIO request. The key select signal output from the one-hot checker and encoder 1035 is input as a control signal to a key selector multiplexor 1040, which selects between a plurality of cryptographic keys 1045 based on the key select signal. If the address ranges are configured incorrectly, i.e., such that the target of the MMIO is within more than one address range register that map to different keys, then the one-hot checker and encoder 1035 generates a disable match signal that blocks execution of the MMIO request. Thus, one-hot checker and encoder 1035 and key selector 1040 form a unique association between a memory address in the device to a cryptographic key 1045 when the ranges were configured correctly to not-overlap, or to map to the same key when they do overlap. When address ranges were configured such that the target address of the MMIO does not associate to a single key, the MMIO request is not executed, and an error may be generated, the error may specify whether it is a result of AT mismatch or error due to failure to map to a unique key.

If a single key is selected, i.e., if the one hot checker and encoder 1035 resolve to a single key, then the selected cryptographic key and the address are input to an authentication tag calculator 1030, which calculates an authentication tag for the MMIO request. For example, the key selected for the authentication tag calculation at 1030 may be used in operation 508 for write requests, and in operation 706 for read requests. Similarly, the key selected for the authentication tag calculation at 1030 may be used to encrypt/decrypt data in operation 506 for write request and in operation 712 for read requests. As described above, the authentication tag may be generated based on the encrypted data using an authenticated encryption algorithm such as AES-GCM. The authentication tag may be embodied as any hash, message authentication code, or other value that may be used to authenticate the encrypted data and additional authentication data.

The disable match signal, the authentication tag generated in operation 1030, and the authentication tag 1015 received with the MMIO request are input to a matching device 1050 (e.g., a comparator). For example, the comparator 1030 may correspond to the matching operation in operation 510 for write requests and operation 708 for read requests.

If the authentication tag generated in operation 1030 matches the authentication tag 1015 received from the application and the disable match signal is not set, then the MMIO request is executed. By contrast, if at operation 1035 the disable match signal is set or if the authentication tag generated in operation 1030 does not match the authentication tag 1015 received from the application then the MMIO request is rejected and an error signal is generated. In addition, if the one-hot checker detects that the target address of the MMIO request matches more than one key, the one-hot checker blocks execution of the request similarly to when the authentication tags mismatch. As described above, a status register may be set to indicate that the MMIO write request was not performed successfully and distinguish between failure by authentication mismatch and failure to identify a unique key.

Figure 11:
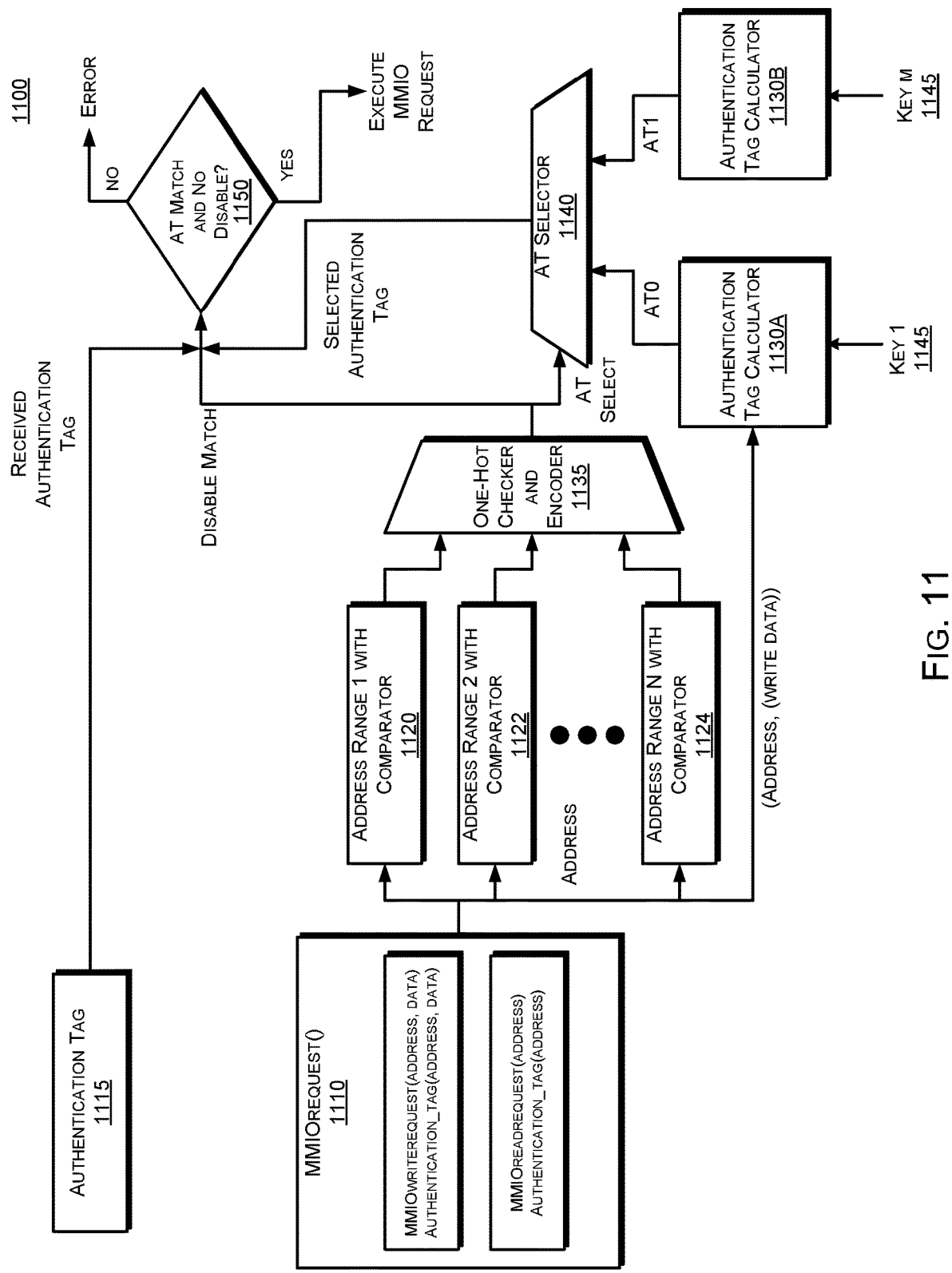
FIG. 11 is a schematic illustration of components and operations to provide secure direct memory access transactions in a virtualized computing environment, according to embodiments.

FIG. 11 is a schematic illustration of components and operations to provide secure direct memory access transactions in a virtualized computing environment 1100, according to embodiments. The embodiment depicted in FIG. 10 re-initializes the cryptographic engine when the cryptographic keys change, which can cause a processing delay. The embodiment depicted in in FIG. 11 avoids the processing delay to initialize the cryptographic engine with a different key. The address of the request may also be used to enable the cryptographic engine to save power.

Referring to FIG. 11, in some examples an MMIO request 1110 and an authentication tag (AT) 1115 may be received.

As described above, the MMIO request 1110 and authentication tag (AT) 1115 may be received in the accelerator 136 and may be either a MMIO write request transaction or an MMIO read request transaction. An MMIO write request transaction and the associated authentication tag will comprise a target memory address for a memory location in the device and data associated with the MMIO write request. As described above, the MMIO write request may be received from an MMIO engine as in operation 408 or other MMIO component of the computing device. The encrypted data may be embodied as a 32-bit value, a 64-bit value, or other relatively small data item. The MMIO write request may include the encrypted data as well as an associated address such as a memory address, register offset, or other addressing information. An MMIO read request transaction and the associated authentication tag may include a target memory address for the read request transaction. As described above with reference to operation 606, the target address associated with the MMIO read request may comprise additional data, such as a memory address, register offset, or other addressing information.

The target address associated with the MMIO request is input into one or more comparators 1120, 1122, 1124, each of which generate an output signal indicative of whether the target address falls within a specified address range. The one-hot checker and encoder 1135 generates an authentication tag select signal that corresponds to the address range that includes the target address. If the address ranges are configured incorrectly, i.e., such that the target of the MMIO is within more than one address range register which map to different authentication tag calculators 1030, then the one-hot checker and encoder 1135 generates a disable match signal that blocks execution of the MMIO request. The authentication tag select signal and disable match signal output from the one-hot checker and encoder 1135 is input as a control signal to an authentication tag selector multiplexor 1140, which selects between a plurality of authentication tags generated by one or more authentication tag calculators 1130A, 1130B each calculated with its associated cryptographic key 1145. As described above, the authentication tags may be generated based on the encrypted data using an authenticated encryption algorithm such as AES-GCM. The authentication tags may be embodied as any hash, message authentication code, or other value that may be used to authenticate the encrypted data and additional authentication data. Thus, priority encoder 1135 and authentication tag selector 1140 form a unique association between each memory address range in the device to an Authentication Tag AT, Authentication Tag Calculator 1130, and cryptographic key 1145. When address ranges were configured such that the target address of the MMIO does not associate to a single authentication tag, the MMIO request is not executed.

The disable match signal from the one-hot checker and encoder 1135, the authentication tag 1115 received from the application, and the authentication tag selected by the authentication tag selector 1140 are input to a matching device 1150 (e.g., a comparator). If the authentication tag selected by the authentication tag selector 1140 matches the authentication tag 1115 received from the application and the disable match signal is not set, then the MMIO request is executed. By contrast, if the authentication tag selected by the authentication tag selector 1140 does not match the authentication tag 1115 received from the application then the MMIO request is rejected and an error signal is generated. In addition, if the one-hot checker detects that the target address of the MMIO request matches more than one authentication tag, the one-hot checker blocks execution of the request similarly to when the authentication tags mismatch. As described above, a status register may be set to indicate that the MMIO write request was not performed successfully and distinguish between failure by authentication mismatch and failure to identify a unique authentication tag.

Figure 12:
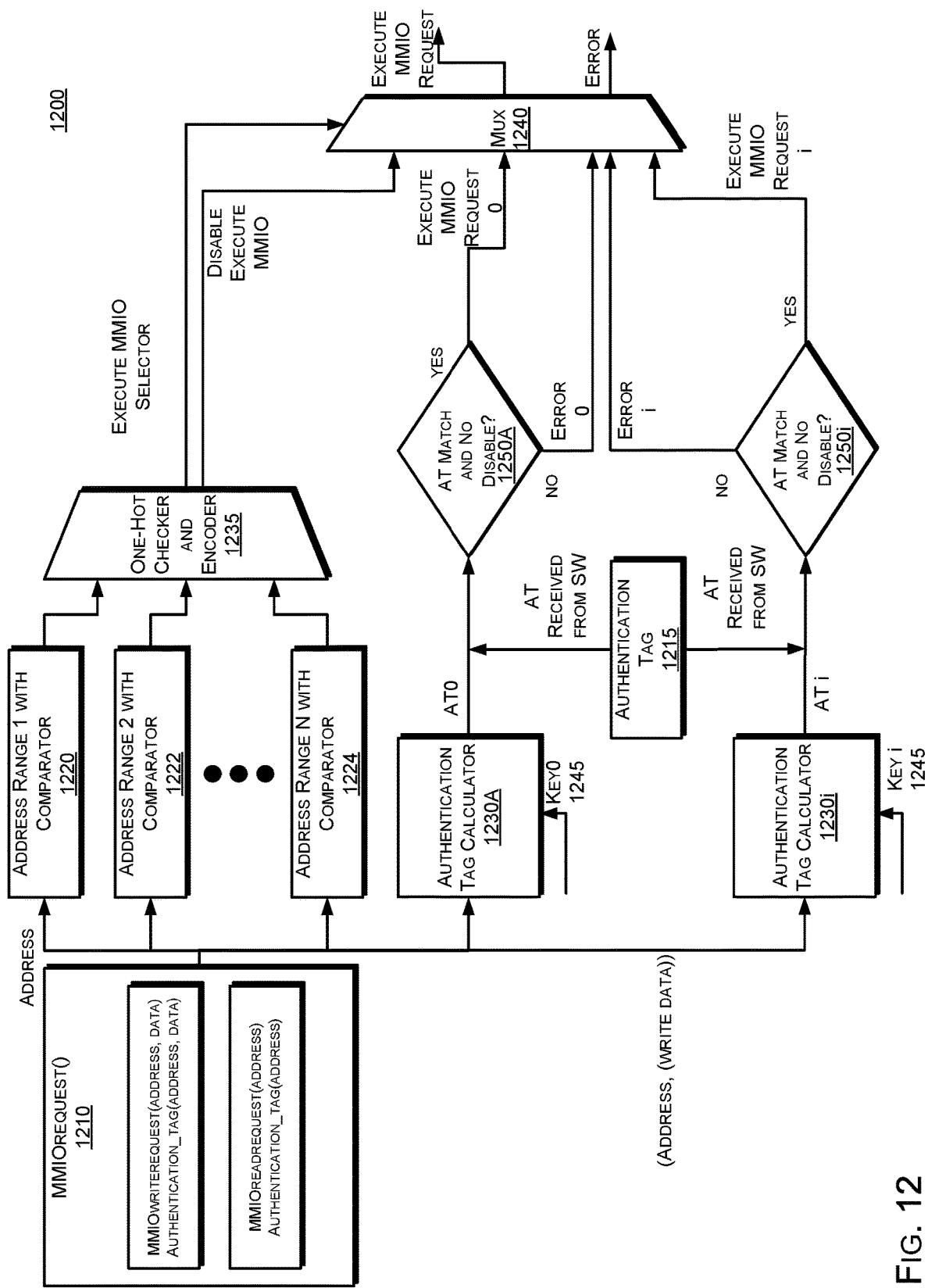
FIG. 12 is a schematic illustration of components of a device to provide secure direct memory access transactions in a virtualized computing environment, according to embodiments.

FIG. 12 is a schematic illustration of components and operations to provide secure direct memory access transactions in a virtualized computing environment 1200, according to embodiments. In the embodiment depicted in FIG. 12, the authentication tags are calculated and compared in parallel and the address of the request is used to select which cryptographic key and cryptographic engine gates the MMIO request. The address of the request may also be used to enable the cryptographic engine and comparator.

Referring to FIG. 12, in some examples an MMIO request 1210 and an authentication tag (AT) 1215 may be received. As described above, the MMIO request 1210 and authentication tag (AT) 1215 may be received in the accelerator 136 and may be either a MMIO write request transaction or an MMIO read request transaction. An MMIO write request transaction and the associated authentication tag will comprise a target memory address for a memory location in the device and data associated with the MMIO write request. As described above, the MMIO write request may be received from an MMIO engine as in operation 408 or other MMIO component of the computing device. The encrypted data may be embodied as a 32-bit value, a 64-bit value, or other relatively small data item. The MMIO write request may include the encrypted data as well as an associated address such as a memory address, register offset, or other addressing information. An MMIO read request transaction and the associated authentication tag may include a target memory address for the read request transaction. As described above, the target address associated with the MMIO read request may comprise additional data, such as a memory address, register offset, or other addressing information.

The target address associated with the MMIO request is input into one or more comparators 1220, 1222, 1224, each of which generate an output signal indicative of whether the target address falls within a specified address range. The output signals are input to a one-hot checker and encoder 1235, which generates the select execute MMIO signal or a disable execute MMIO signal. Both the select execute MMIO signal output from the one-hot checker and encoder 1235 and disable Execute MMIO signal are input as control signals to multiplexor 1240.

The target address is input to an authentication tag calculators 1230A, . . . 1230i, which calculate an authentication tag for the MMIO request using the target address and cryptographic keys 1245A, . . . 1245i. As described above, the authentication tag may be generated based on the encrypted data using an authenticated encryption algorithm such as AES-GCM. The authentication tag may be embodied as any hash, message authentication code, or other value that may be used to authenticate the encrypted data and additional authentication data.

The authentication tags computed by authentication tag calculators 1230A, . . . 1230i, and the authentication tag 1215 received from the application are input to matching devices 1250A, . . . 1250i (e.g., comparators) to evaluate the respective Execute MMIO Requests. If the authentication tag 1215 received from the application matches the authentication tag calculated with the key of the Authentication Tag Calculator 1230 the matching comparators 1250A, . . . 1250i set the Execute MMIO Request to enable execution. If the one-hot checker and enabler selects the output of a 1250 matching device output with corresponding Execute MMIO Request set to enable execution, then the MMIO request is executed. By contrast, if the selected Execute MMIO output is not set because the authentication tag calculated by the respective authentication tag calculator 1230A, . . . 1230*i* does not match the authentication tag 1215 received from the application, then the MMIO request is rejected and an error signal is generated. In addition, if the one-hot checker detects that the target address of the MMIO request matches more than one address range and would select the output of more than one comparator, the one-hot checker blocks execution of the request similarly to when the authentication tags mismatch and forces an Error. As described above, a status register may be set to indicate that the MMIO write request was not performed successfully and distinguish between failure by authentication mismatch and failure to identify a unique key.

In a virtualized computing environment, physical computing devices can be partitioned into multiple virtual devices. Different users (i.e., different virtual machines (VMs)) running on one or more CPUs may be assigned different virtual devices by the operating system (OS) and/or the virtual machine manager (VMM). Applications which execute in a virtualized computing environment rely on the OS and the VMM to provide exclusive (i.e., protected) access to a device, such that the application's secrets may be shared securely with only the device.

The local memory of the device can be assigned to different applications (or users, or tenants of the device) and mapped to the address space of the device. Different "users" (i.e., different VMs) executing on the CPU may be assigned the different regions of device physical local memory by the OS-VMM which manages the resources of the device and isolation between the VMs by not assigning the same physical addresses of the device to more than one VM.

However, in some instances, an application may not have a relationship of trust with either the OS or the VMM, and therefore the application cannot trust that data shared with a virtual device executing on a physical device will not be accessed or modified by the OS and VMM, or that the OS or VMM will not provide access to the physical memory space in the device assigned to the application to other VMs executing in the VM environment. In some examples of existing mechanisms for isolation, an application running on a CPU can configure a Direct Memory Access (DMA) engine on a device to transfer data between device local memory and host memory through DMA when no other application is authorized to access memory on the device.

To address these and other issues, in some examples hardware on the device may be adapted to support partition of device's memory with multiple encryption keys that may be used to separate the memory into different regions (e.g., address ranges), which may be assigned to different tenants using the device. By way of overview, in some examples hardware in the device selects a cryptographic key to be used for encryption and/or calculation of an authentication tag of memory access on the local address in the device. Device hardware implements multiple address range registers (ARR) to associate to the different keys. An application takes ownership of its protected memory by programming the address range register assigned to it with the address range of its protected memory and associating the address range register to its key.

In some examples address range values in the address range registers and the association to the keys are configured securely and correctly, such that both the address range and associated key belong to the same user (i.e., application). For example, the OS/VMM managing the application (or another VM/application operating as an attacker) is prevented from also mapping a different key belonging to an attacker to memory ranges assigned to the application.

In some examples an agent (i.e., a program) trusted by the application and OS/VMM to configure the memory ranges and keys correctly may be the only agent capable of programming the ARR and associating keys. In some examples access control of the address range registers only by the trusted agent is enforced, for example, by protecting the address range of the address range registers with a key available only to this trusted agent. In another example, hardware in the device may also assist in enforcement of correct configuration of the address range registers, such that the trusted agent has less responsibility and can be smaller. In another example there may be multiple agents in the platform that each are trusted by the OS/VMM and the application it serves, but do not need to be trusted by the other applications executing on the OS/VMM, i.e., logic prevents configuration of values in the address range registers that overlap with address ranges already configured in ARR assigned to a different application. In another example hardware logic prevents the memory access when an address of the memory access is within more than 1 address range register, in another example hardware logic prevents the memory access when an address of the memory access is within more than 1 address range register.

Optionally, direct memory access (DMA) integrity may be protected using a protocol in which software reads and compares an authentication tag (AT) calculated by hardware on all the memory accesses to one memory in the address range register. In some examples, an authentication tag may be calculated in accordance with the address range specified by one or more address range registers associated with the same key. Detection of improper access to assigned resources (i.e., local memory) in the device may be detected through comparison of authentication tag at the application level without need for hardware support in the host processor.

In some examples a unique cryptographic key for encryption and for decryption is applied to each of the protected range(s) of memory addresses in the device. In some examples a unique cryptographic key pair, one key for encryption and one key for decryption is applied to each of the protected range(s) of memory addresses in the device. An application configures or requests a trusted agent to configure the address range register or registers such that the ARR configuration covers the memory addresses on the device the application wants to protect with encryption using the application's cryptographic key. Thus, an entity that does not possess the unique cryptographic key (i.e., the OS/VMM or other applications executing on the platform) will not be able to decrypt data stored in those memory address ranges. Nor, will the entity be able to change (i.e., corrupt) the value stored in that memory range with a specific desired value, nor avoid detection of corruption if authentication is implemented.

In some examples, the application may optionally calculate and compare an authentication tag (i.e., a hash) of the expected memory transfers to detect unauthorized access to the protected address range. An application can periodically, or in response to a signal, validate the integrity of the data in the address range by calculating an authentication tag on all memory transactions that occur during a time period and comparing the calculated authentication tag to the authentication tag calculated by hardware. For example, on a direct memory access (DMA), the application software sets the address range registers to the range of addresses of the direct memory access buffer in device memory. The device hardware calculates the authentication tag for the address range register(s) associated with the direct memory access. The application calculates the authentication tag for the direct memory access data and compares it to the authentication tag calculated by the device hardware on all data transactions to the direct memory access buffer. The application may tag may also compare the authentication tags calculated on the data stored on a protected memory range by the device against the data read by the application or the expected data in the protected memory after the application has written to the protected memory range.

In examples described herein the different, unique cryptographic keys are used to encrypt and calculate the authentication tags for different target memory address ranges on the device. This enables assignment of memory in the device to different users. Only entities that know the unique cryptographic key associated with the target address can encrypt or decrypt data stored in the protected device memory or calculate the authentication tag that matches the value calculated by the device on the data transferred or on the memory stored on the device memory expected by the application for the protected address range. Further, logic in the device can provide additional support to enforce correct separation of memory space. For example, logic can be added to prevent configuration of address range registers belonging to different applications with address ranges that overlap, or prevent configuration of address ranger registers with address ranges that overlap and map to different keys (i.e., to enforce uniqueness of key to each address at configuration time), or to a key that doesn't belong to the application or to a key that doesn't belong to the owner of the address range register (i.e., to prevent enforce association of address range to a key owned by different applications at configuration time) or block memory access if the address of the memory access matches more than one encryption engine and key (i.e., to enforce uniqueness of key to each address at memory access time).

In some examples the techniques to implement cryptographic separation of memory on a device with use in DMA protection may be implemented in a computing environment such as that depicted in FIG. 1 through FIG. 3, described above, and may modify the operations depicted in FIGS. 4-9, described above. Components, architectures, and techniques to implement cryptographic separation of memory access requests in virtual computing environments are described in greater detail below with reference to FIG. 13.

Figure 13:
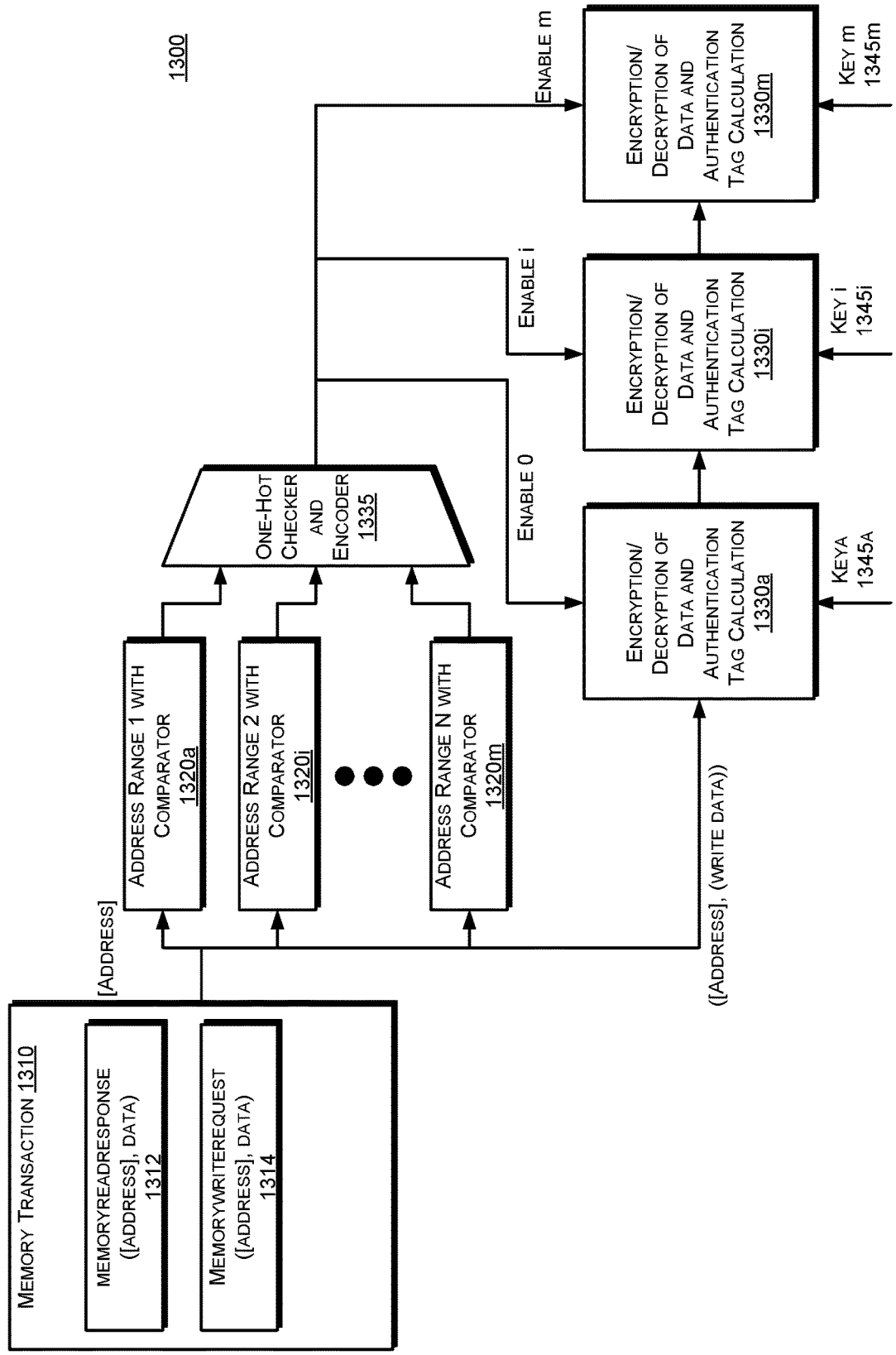
FIG. 13 is a schematic illustration of components and operations to provide cryptographic separation of memory on a device with use in DMA protection, according to embodiments.

FIG. 13 is a schematic illustration of components and operations to provide secure direct memory access transactions in a device, such as an accelerator device 136 depicted in FIGS. 1-3, in a virtualized computing environment 1000, according to embodiments. In some examples the address range(s) of memory in the device 136 may be protected by a cryptographic key such that only a user (i.e., an application) which possesses the cryptographic key can access memory in the memory range protected by the cryptographic key. In some examples the trusted agent 303 executing in the trusted execution environment 302 is responsible for assigning one or more cryptographic keys to application(s) executing on the computing device 100. In some examples the trusted agent may select the first cryptographic key selected from a plurality of cryptographic keys maintained or generated by the trusted agent 303 that are to be assigned to a plurality of different applications. The one or more address range registers 311 of the accelerator device 136 are enhanced to provide a logical association between the cryptographic key(s) and the memory address ranges on the device 136 instead of only associating the address range with a protected or unprotect memory space.

Referring to FIG. 13, in some examples a memory transaction to the host may be initiated at the device 136 by a DMA controller as part of DMA between host memory and device memory. The memory transaction initiated by device 136 may be a memory read request transaction or a memory write request transaction. In some read request examples, the read request may comprise the address in the host memory and a transaction identifier. The read memory request will trigger a read response from the I/O Subsystem 124 and host memory 130. In some examples, the read response may comprise the data read from the memory address and a transaction identifier that can be mapped to the memory read request that triggered the read response which can be mapped by the DMA controller to the memory address on device 136 where the read response data will be stored. The memorywriterequest 1314 is comprised of the data to write in host memory and the address in the host memory 130 to write the data. In some cases, the memorywriterequest 1314 is initiated by a DMA controller in device 136 and the memorywriterequest and the data in the memorywriterequest 1314 can be associated to the address in the memory of device 136 from which the data in the memorywrite request was read. The memory transactions memoryreadresponse 1312 and memorywriterequest 1314 that carry data undergo encryption and optional authentication tag computation for privacy and optional integrity protection.

The address in the memory of the device associated with the memory transaction 1310 is input into one or more comparators 1320a, . . . , 1320i, . . . 1320n, each of which generates an output signal indicative of whether the target address falls within the specified memory address range on the device 136. In some examples the address range registers associated with the one or more comparators 1320a, . . . , 1320i, . . . 1320n may correspond to the address range registers 311 described above. The output signals of the comparators 1320a, . . . , 1320i, . . . 1320n may be input into a one-hot checker and encoder 1335. The one-hot checker and encoder 1335 enables the crypto engine associated to the address range that includes the target address. The enable signals generated by the one-hot checker and encoder 1335 initiate a process on at most one of the processes 1330a, . . . 1330i, . . . 1330m for the encryption/decryption of the data associated with the memory transaction and optional authentication tag calculation. The process 1330 that is enabled performs the cryptographic operation with data key and update AT corresponding to 916. All processes 1330a, . . . 1330i, . . . 1330m receive the data and the target address in the device associated to the data as an input. The process 1330a accepts the cryptographic key identified as key a 1345a, the process 1330i accepts the cryptographic key identified as key i 1345i, and so forth up to process 1330m that accepts the cryptographic key identified as key 1345m.

In some examples, an application may elect to associate more than one address range register 1320a to its key. In this case, the union of the addresses covered in these ARR will map to the same key and enable the same crypto engine 1330.

When the implementation elected to provide logic to block memory access if the address of the memory access matches more than one key (i.e., logic to enforce uniqueness of key to each address at memory access time), the encoder 1335 that maps the patterns of address range comparator 1320 to select crypto engine 1345 is enhanced to also disable all crypto engines 1345 when it detects that the output of comparators 1320 would enable more than one encryption engine 1345.

In some examples the remainder of the memory transaction process, including the encryption/decryption of data an authentication tag calculation, may be performed substantially as described above with reference to FIG. 9. Thus, the structure and operations described herein enable secure direct memory access operations in a device that may be accessed by multiple different users (i.e., applications).

EXAMPLES

Illustrative examples of the technologies disclosed herein are provided below. An embodiment of the technologies may include any one or more, and any combination of, the examples described below.

Example 1 includes a computing device for secure data transfer, the computing device comprising a trusted agent to assign a first cryptographic key to a first application executing on the computing device, the first cryptographic key selected from a plurality of cryptographic keys that are to be assigned to a plurality of different applications; an accelerator device comprising a plurality of address range registers to associate a plurality of memory address ranges with the plurality of cryptographic keys; a secure memory agent to map a direct memory access request to a protected memory region; an authentication tag controller to initialize an authentication tag in response to an initialization command from the trusted execution environment; a direct memory access engine to initiate a transfer data between a host memory and an accelerator device memory in response to a descriptor from the trusted execution environment, wherein the descriptor comprises a target memory address and is indicative of a transfer direction; a memory range selection engine comprising at least one comparator to compare the target memory address with a plurality of address ranges and to select a cryptographic key from the plurality of plurality of address range registers based on the target memory address; and an accelerator cryptographic engine to (i) perform a cryptographic operation with the data in response to a transfer of the data and (ii) update the authentication tag in response to the transfer of the data; wherein the authentication tag controller is further to finalize the authentication tag in response to a finalization command from the trusted execution environment.

Example 2 includes the subject matter of Example 1, and wherein the transfer direction comprises host device to accelerator device to perform the cryptographic operation comprises to decrypt encrypted data to generate plaintext data; and to transfer the data between the host memory buffer and the accelerator device buffer comprises to (i) copy the encrypted data from the host memory buffer and (ii) forward the plaintext data to the accelerator device buffer in response to decryption of the encrypted data.

Example 3 includes the subject matter of any of Examples 1-2, and wherein the memory-mapped I/O transaction comprises a memory-mapped I/O write, and wherein the transfer direction comprises accelerator device to host device; to perform the cryptographic operation comprises encrypted plaintext data to generate encrypted data; and to transfer the data between the host memory buffer and the accelerator device buffer comprises to (i) copy the plaintext data from the accelerator device buffer and (ii) forward the encrypted data to the host memory buffer in response to encryption of the plaintext data.

Example 4 includes the subject matter of any of Examples 1-3, and wherein the trusted execution environment comprises a direct memory access manager to: (i) securely write the initialization command to the accelerator device to initialize the secure DMA transfer, (ii) securely configure the descriptor, and (iii) securely write the finalization command to the accelerator device to finalize the authentication tag.

Example 5 includes the subject matter of any of Examples 1-4, and wherein each of to securely write the initialization command, to securely configure the descriptor, and to securely write the finalization command comprises to dispatch a memory-mapped I/O write.

Example 6 includes the subject matter of any of Examples 1-5, wherein the trusted execution environment further comprises a host validator to determine an expected authentication tag based on the secure DMA transfer; read the authentication tag from the accelerator device in response to a secure write of the finalization command; and determine whether the authentication tag matches the expected authentication tag.

Example 7 includes the subject matter of any of Examples 1-6, and the accelerator validator is to compare the first authentication tag to the second authentication tag.

Example 8 includes the subject matter of any of Examples 1-7, and wherein the accelerator device comprises a field-programmable gate array (FPGA); and the trusted execution environment comprises a secure enclave established with secure enclave support of a processor of the computing device.

Example 9 is one or more computer-readable storage media comprising a plurality of instructions stored thereon that, in response to being executed, cause a computing device to assign, at a trusted agent of the computing device, a first cryptographic key to a first application executing on the computing device, the first cryptographic key selected from a plurality of cryptographic keys that are to be assigned to a plurality of different applications; initialize, by an accelerator device of the computing device, an authentication tag in response to an initialization command from a trusted execution environment of the computing device; initiate a transfer, by the accelerator device, of data between a host memory and an accelerator device memory in response to a descriptor from the trusted execution environment, wherein the descriptor comprises a target memory address and is indicative of a transfer direction; compare, in a memory range selection engine comprising at least one comparator to compare the target memory address with a plurality of address ranges and select a cryptographic key from the plurality of plurality of address range registers based on the target memory address; perform, by the accelerator device, a cryptographic operation with the data in response to transferring the data; update, by the accelerator device, the authentication tag in response to transferring the data; and finalize, by the accelerator device, the authentication tag in response to a finalization command from the trusted execution environment.

Example 10 includes the subject matter of Example 9, and wherein the transfer direction comprises host device to accelerator device; to perform the cryptographic operation comprises to decrypt encrypted data to generate plaintext data; and to transfer the data between the host memory buffer and the accelerator device buffer comprises to (i) copy the encrypted data from the host memory buffer and (ii) forward the plaintext data to the accelerator device buffer in response to decryption of the encrypted data.

Example 11 includes the subject matter of any of Examples 9-10, and wherein the transfer direction comprises accelerator device to host device; to perform the cryptographic operation comprises encrypted plaintext data to generate encrypted data; and to transfer the data between the host memory buffer and the accelerator device buffer comprises to (i) copy the plaintext data from the accelerator device buffer and (ii) forward the encrypted data to the host memory buffer in response to encryption of the plaintext data.

Example 12 includes the subject matter of any of Examples 9-11, and wherein the trusted execution environment comprises a direct memory access manager to: (i) securely write the initialization command to the accelerator device to initialize the secure DMA transfer, (ii) securely configure the descriptor, and (iii) securely write the finalization command to the accelerator device to finalize the authentication tag.

Example 13 includes the subject matter of any of Examples 9-12, and wherein each of to securely write the initialization command, to securely configure the descriptor, and to securely write the finalization command comprises to dispatch a memory-mapped I/O write.

Example 14 includes the subject matter of any of Examples 9-13, and wherein the trusted execution environment further comprises a host validator to: determine an expected authentication tag based on the secure DMA transfer; read the authentication tag from the accelerator device in response to a secure write of the finalization command; and determine whether the authentication tag matches the expected authentication tag.

Example 15 includes the subject matter of any of Examples 9-14, wherein the accelerator validator is to compare the first authentication tag to the second authentication tag.

Example 16 includes a computer-based method for secure data transfer, comprising assigning, at a trusted agent of the computing device, a first cryptographic key to a first application executing on the computing device, the first cryptographic key selected from a plurality of cryptographic keys that are to be assigned to a plurality of different applications; initializing, by an accelerator device of the computing device, an authentication tag in response to an initialization command from a trusted execution environment of the computing device; initiating a transfer, by the accelerator device, of data between a host memory and an accelerator device memory in response to a descriptor from the trusted execution environment, wherein the descriptor comprises a target memory address and is indicative of a transfer direction; comparing, in a memory range selection engine comprising at least one comparator to compare the target memory address with a plurality of address ranges and select a cryptographic key from the plurality of plurality of address range registers based on the target memory address; performing, by the accelerator device, a cryptographic operation with the data in response to transferring the data; updating, by the accelerator device, the authentication tag in response to transferring the data; and finalizing, by the accelerator device, the authentication tag in response to a finalization command from the trusted execution environment.

Example 17 includes the subject matter of Example 16, the transfer direction comprises host device to accelerator device; performing the cryptographic operation comprises decrypting encrypted data to generate plaintext data; and transferring the data between the host memory buffer and the accelerator device buffer comprises to (i) copy the encrypted data from the host memory buffer and (ii) forward the plaintext data to the accelerator device buffer in response to decryption of the encrypted data.

Example 18 includes the subject matter of Example 16-17, and wherein the transfer direction comprises accelerator device to host device; performing the cryptographic operation comprises encrypted plaintext data to generate encrypted data; and transferring the data between the host memory buffer and the accelerator device buffer comprises to (i) copy the plaintext data from the accelerator device buffer and (ii) forward the encrypted data to the host memory buffer in response to encryption of the plaintext data.

Example 19 includes the subject matter of any of Examples 16-18, and wherein the trusted execution environment comprises a direct memory access manager to: (i) securely write the initialization command to the accelerator device to initialize the secure DMA transfer, (ii) securely configure the descriptor, and (iii) securely write the finalization command to the accelerator device to finalize the authentication tag.

Example 20 includes the subject matter of any of Examples 16-19, wherein each of to securely write the initialization command, to securely configure the descriptor, and to securely write the finalization command comprises to dispatch a memory-mapped I/O write.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A computing device for secure data transfer, the computing device comprising: a trusted execution environment comprising: a trusted agent to assign a first cryptographic key to a first application executing on the computing device, the first cryptographic key selected from a plurality of cryptographic keys that are to be assigned to a plurality of different applications; an accelerator device comprising: a plurality of address range registers to associate a plurality of memory address ranges with the plurality of cryptographic keys; a secure memory agent to map a direct memory access request to a protected memory region; an authentication tag controller to initialize an authentication tag in response to an initialization command from the trusted execution environment; a direct memory access engine to initiate a transfer of data between a host memory and an accelerator device memory in response to a descriptor from the trusted execution environment, wherein the descriptor comprises a target memory address and is indicative of a transfer direction; a memory range selection engine comprising at least one comparator to compare the target memory address with a plurality of address ranges and to select a cryptographic key from the plurality of plurality of address range registers based on the target memory address; and an accelerator cryptographic engine to (i) perform a cryptographic operation with the data in response to the transfer of the data and (ii) update the authentication tag in response to the transfer of the data; wherein the authentication tag controller is further to finalize the authentication tag in response to a finalization command from the trusted execution environment.

2. The computing device of claim 1, wherein:
the transfer direction comprises host device to accelerator device;
to perform the cryptographic operation comprises to decrypt encrypted data to generate plaintext data; and
to transfer the data between the host memory buffer and the accelerator device buffer comprises to (i) copy the encrypted data from the host memory buffer and (ii) forward the plaintext data to the accelerator device buffer in response to decryption of the encrypted data.

3. The computing device of claim 1, wherein:
the transfer direction comprises accelerator device to host device;
to perform the cryptographic operation comprises encrypted plaintext data to generate encrypted data; and
to transfer the data between the host memory buffer and the accelerator device buffer comprises to (i) copy the plaintext data from the accelerator device buffer and (ii) forward the encrypted data to the host memory buffer in response to encryption of the plaintext data.

4. The computing device of claim 3, wherein the trusted execution environment comprises a direct memory access manager to: (i) securely write the initialization command to the accelerator device to initialize the secure DMA transfer, (ii) securely configure the descriptor, and (iii) securely write the finalization command to the accelerator device to finalize the authentication tag.

5. The computing device of claim 4, wherein each of to securely write the initialization command, to securely configure the descriptor, and to securely write the finalization command comprises to dispatch a memory-mapped I/O write.

6. The computing device of claim 4, wherein the trusted execution environment further comprises a host validator to:
determine an expected authentication tag based on the secure DMA transfer;
read the authentication tag from the accelerator device in response to a secure write of the finalization command; and
determine whether the authentication tag matches the expected authentication tag.

7. The computing device of claim 4, wherein:
the accelerator validator is to compare the first authentication tag to the second authentication tag.

8. The computing device of claim 1, wherein:
the accelerator device comprises a field-programmable gate array (FPGA); and
the trusted execution environment comprises a secure enclave established with secure enclave support of a processor of the computing device.

9. One or more non-transitory computer-readable storage media comprising a plurality of instructions stored thereon that, in response to being executed, cause a computing device to:
assign, at a trusted agent of the computing device, a first cryptographic key to a first application executing on the computing device, the first cryptographic key selected from a plurality of cryptographic keys that are to be assigned to a plurality of different applications;
initialize, by an accelerator device of the computing device, an authentication tag in response to an initialization command from a trusted execution environment of the computing device;
initiate a transfer, by the accelerator device, of data between a host memory and an accelerator device memory in response to a descriptor from the trusted execution environment, wherein the descriptor comprises a target memory address and is indicative of a transfer direction;
compare, in a memory range selection engine comprising at least one comparator to compare the target memory address with a plurality of address ranges and select a cryptographic key from the plurality of plurality of address range registers based on the target memory address;
perform, by the accelerator device, a cryptographic operation with the data in response to transferring the data;
update, by the accelerator device, the authentication tag in response to transferring the data; and
finalize, by the accelerator device, the authentication tag in response to a finalization command from the trusted execution environment.

10. The one or more non-transitory computer-readable storage media of claim 9, wherein:
the transfer direction comprises host device to accelerator device;
to perform the cryptographic operation comprises to decrypt encrypted data to generate plaintext data; and
to transfer the data between the host memory buffer and the accelerator device buffer comprises to (i) copy the encrypted data from the host memory buffer and (ii) forward the plaintext data to the accelerator device buffer in response to decryption of the encrypted data.

11. The one or more non-transitory computer-readable storage media of claim 9, wherein:
the transfer direction comprises accelerator device to host device;
to perform the cryptographic operation comprises encrypted plaintext data to generate encrypted data; and
to transfer the data between the host memory buffer and the accelerator device buffer comprises to (i) copy the plaintext data from the accelerator device buffer and (ii) forward the encrypted data to the host memory buffer in response to encryption of the plaintext data.

12. The one or more non-transitory computer-readable storage media of claim 11, wherein the trusted execution environment comprises a direct memory access manager to: (i) securely write the initialization command to the accelerator device to initialize the secure DMA transfer, (ii) securely configure the descriptor, and (iii) securely write the finalization command to the accelerator device to finalize the authentication tag.

13. The one or more non-transitory computer-readable storage media of claim 11, wherein each of to securely write the initialization command, to securely configure the descriptor, and to securely write the finalization command comprises to dispatch a memory-mapped I/O write.

14. The one or more non-transitory computer-readable storage media of claim 12, wherein the accelerator validator is to compare the first authentication tag to the second authentication tag.

15. The one or more non-transitory computer-readable storage media of claim 9, wherein the trusted execution environment further comprises a host validator to:
determine an expected authentication tag based on the secure DMA transfer;
read the authentication tag from the accelerator device in response to a secure write of the finalization command; and
determine whether the authentication tag matches the expected authentication tag.

16. A computer-based method for secure data transfer, comprising:
assigning, at a trusted agent of the computing device, a first cryptographic key to a first application executing on the computing device, the first cryptographic key selected from a plurality of cryptographic keys that are to be assigned to a plurality of different applications;
initializing, by an accelerator device of the computing device, an authentication tag in response to an initialization command from a trusted execution environment of the computing device;
initiating a transfer, by the accelerator device, of data between a host memory and an accelerator device memory in response to a descriptor from the trusted execution environment, wherein the descriptor comprises a target memory address and is indicative of a transfer direction;
comparing, in a memory range selection engine comprising at least one comparator to compare the target memory address with a plurality of address ranges and select a cryptographic key from the plurality of plurality of address range registers based on the target memory address;

performing, by the accelerator device, a cryptographic operation with the data in response to transferring the data;

updating, by the accelerator device, the authentication tag in response to transferring the data; and finalizing, by the accelerator device, the authentication tag in response to a finalization command from the trusted execution environment.

17. The computer-based method of claim 16, wherein:

the transfer direction comprises host device to accelerator device;

performing the cryptographic operation comprises decrypting encrypted data to generate plaintext data; and transferring the data between the host memory buffer and the accelerator device buffer comprises to (i) copy the encrypted data from the host memory buffer and (ii) forward the plaintext data to the accelerator device buffer in response to decryption of the encrypted data.

18. The computer-based method of claim 16, wherein:

the transfer direction comprises accelerator device to host device;

performing the cryptographic operation comprises encrypted plaintext data to generate encrypted data; and transferring the data between the host memory buffer and the accelerator device buffer comprises to (i) copy the plaintext data from the accelerator device buffer and (ii) forward the encrypted data to the host memory buffer in response to encryption of the plaintext data.

19. The computer-based method of claim 18, wherein the trusted execution environment comprises a direct memory access manager to: (i) securely write the initialization command to the accelerator device to initialize the secure DMA transfer, (ii) securely configure the descriptor, and (iii) securely write the finalization command to the accelerator device to finalize the authentication tag.

20. The computer-based method of claim 18, wherein each of to securely write the initialization command, to securely configure the descriptor, and to securely write the finalization command comprises to dispatch a memory-mapped I/O write.

\* \* \* \* \*